United States Patent
Lin et al.

(10) Patent No.: US 10,698,516 B2
(45) Date of Patent: Jun. 30, 2020

(54) TOUCH SENSOR, TOUCH PANEL AND METHOD FOR MANUFACTURING THE SAME

(71) Applicant: TPK Touch Solutions (Xiamen) Inc., Xiamen (CN)

(72) Inventors: Ching-Shan Lin, Tainan (TW); Chun-Yan Wu, Fuzhou (CN); Chung-Chin Hsiao, Hsinchu County (TW); Hwai-Hai Chiang, Taipei (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 8 days.

(21) Appl. No.: 16/226,595

(22) Filed: Dec. 19, 2018

(65) Prior Publication Data

US 2019/0196633 A1    Jun. 27, 2019

(51) Int. Cl.
*G06F 3/041* (2006.01)
*G06F 3/044* (2006.01)

(52) U.S. Cl.
CPC .......... *G06F 3/0412* (2013.01); *G06F 3/041* (2013.01); *G06F 3/044* (2013.01); *G06F 3/0416* (2013.01); *G06F 2203/04103* (2013.01)

(58) Field of Classification Search
CPC ............ G06F 2203/04103; G06F 1/16; G06F 2203/04102; G06F 2203/04112; G06F 2203/04107; G06F 3/047; G06F 1/1652; G06F 3/041; G06F 1/1643; G06F 3/044; G06F 3/0412; B32B 2457/208; B32B 7/12; B32B 2307/412; B32B 2405/00; B32B 2457/20; B32B 37/12; B32B 2307/748; B32B 2250/03; B32B 2250/04; B32B 5/32; B32B 7/04; B32B 9/00; H01L 27/323; H01L 51/0097; G02F 2202/28; G02F 1/13338
USPC ..................... 345/173–175; 178/18.01–18.03
See application file for complete search history.

(56) References Cited

U.S. PATENT DOCUMENTS

| | | | |
|---|---|---|---|
| 2016/0117018 A1* | 4/2016 | Lin | G06F 3/044 349/12 |
| 2017/0329436 A1* | 11/2017 | Choi | G06F 1/1652 |
| 2018/0346761 A1* | 12/2018 | Chen | C09J 7/40 |

* cited by examiner

*Primary Examiner* — Duc Q Dinh
(74) *Attorney, Agent, or Firm* — Cooper Legal Group, LLC

(57) ABSTRACT

A flexible touch-sensing component is formed on a release film by support provided from a first carrier substrate and a second carrier substrate. Then, the flexible touch-sensing component can be attached onto non-planar and curved cover plates through the reloading of a third carrier substrate, so that the touch panel can be lighter and thinner, and have a lower processing cost. In addition, the flexible touch-sensing component uses a film sensor that includes a metal nanowire conductive layer. Since the silver nanowire has flexibility, the touch sensor and the touch panel in the present disclosure can be used in flexible touch-sensing devices and curved-surface touch-sensing devices. Furthermore, based on application of an adhesive reactive ink, the released touch panel can be directly attached to target carrier substrate without adding an auxiliary layer of optical glue or hydrogel glue.

30 Claims, 12 Drawing Sheets

TOUCH SENSOR, TOUCH PANEL AND METHOD FOR MANUFACTURING THE SAME

CROSS-REFERENCE TO RELATED APPLICATION

THIS APPLICATION CLAIMS PRIORITY TO CHINA APPLICATION SERIAL NUMBER 201711393187.6, FILED DEC. 21, 2017, WHICH IS HEREIN INCORPORATED BY REFERENCE.

BACKGROUND

Technology Field

The technical field relates to touch control techniques, and especially to touch sensors, touch panels and methods for manufacturing the same.

Description of the Related Art

In the consumer market for electronic products, touch panels are widely used in various electronic products such as smart phones, cell phones, tablet computers, and laptop computers. Since users can operate and give instructions directly through objects displayed on screens, touch panels provide ergonomic operation interfaces between users and electronic products.

In the manufacturing process of existing touch panels, a touch-sensing component is formed on a substrate by sputtering and photolithography at high temperatures. Generally, a rigid and planar glass or another transparent substrate must be adopted as a carrier substrate for the touch-sensing component. Since these kinds of substrates are thick without flexibility, the touch sensors formed thereon are not attached onto flexible cover plates or curved cover plates. However, directly manufacturing touch-sensing components on flexible substrates or non-planar substrates entails high cost. Therefore, improved structures and manufacturing processes of the existing touch panels are both required.

BRIEF SUMMARY

The embodiments of the present disclosure provide a touch sensor, a touch panel and method for manufacturing the same. Specifically, product requirements of flexible touch-sensing or curved touch sensing are met while satisfying the needs of smaller, thinner and lower process cost of the structures of the touch panels.

The embodiments of the present disclosure provide a method for manufacturing a touch sensor, comprising: S1: providing a first touch-sensing submodule, S1 comprising: S1-1: forming a first release film on a first carrier substrate; S1-2: forming a first flexible touch-sensing component on the first release film; S2: providing a second touch-sensing submodule, S2comprising: S2-1: forming a second release film on a second carrier substrate; S2-2: forming a second flexible touch-sensing component on the second release film; S3: forming a third carrier substrate on the second touch-sensing submodule, and the second touch-sensing submodule and the third carrier substrate have a third release film therebetween; S4: utilizing the second release film to remove the second carrier substrate from the second touch-sensing submodule; and S5: utilizing a first bonding layer to attach the first touch-sensing submodule to the second touch-sensing submodule to form a touch sensor.

Preferably, the first flexible touch-sensing component and the second flexible touch-sensing component are film sensors.

Preferably, the film sensors have a film and a metal nanowire conductive layer formed on the film.

Preferably, the metal nanowire conductive layer comprises a silver nanowire layer and an overcoat layer.

Preferably, further comprising disposing a passivation layer, a protective layer or a hard coating layer on the metal nanowire conductive layer.

Preferably, the metal nanowire conductive layer is electrically connected to a peripheral circuit.

Preferably, the third carrier substrate is removably attached to the second flexible touch-sensing component through the third release film.

Preferably, the second flexible touch-sensing component further comprises a hard coating layer, and the hard coating layer is in contact with the third release film.

Preferably, the first bonding layer is disposed between the second release film and the second flexible touch-sensing component. After the step of removing the second release film, the first bonding layer is exposed, and then the first touch-sensing submodule is attached to the second touch-sensing submodule through the exposed first bonding layer.

Preferably, the film sensors comprise a film and a transferable transparent conductive film attached to the film.

Preferably, a second bonding layer is included, wherein the second bonding layer is disposed between the first flexible touch-sensing component and the first release film.

Preferably, the step of providing a first touch-sensing submodule and the step of providing a second touch-sensing submodule are performed by roll-to-roll processes.

Preferably, the second release film is entirely removed or partially removed.

Preferably, the step of providing a second touch-sensing submodule further comprises forming a flexible electrode component on the second flexible touch-sensing component. The first overcoat layer of the second flexible touch-sensing component is located between the flexible electrode component and the first silver nanowire layer of the second flexible touch-sensing component so that the flexible electrode component is electrically insulating from the first silver nanowire layer of the second flexible touch-sensing component.

Preferably, the flexible electrode component is a film-type sensor, which has a film and a metal nanowire conductive layer formed on the film.

Preferably, the second film-type sensor conductive layer comprises a silver nanowire layer and an overcoat layer.

Preferably, further comprising disposing a passivation layer, a protective layer or a hard coating layer on the second film-type sensor. Alternatively, a passivation layer, a protective layer or a hard coating layer is formed on the metal nanowire layer.

The embodiments of the present disclosure provide a method for manufacturing a touch panel, comprising: S1: providing a first touch-sensing submodule, S1 comprising: S1-1: forming a first release film on a first carrier substrate; S1-2: forming a first flexible touch-sensing component on the first release film; S2: providing a second touch-sensing submodule, S2 comprising: S2-1: forming a second release film on a second carrier substrate; S2-2: forming a second flexible touch-sensing component on the second release film; S3: forming a third carrier substrate on the second touch-sensing submodule, and the second touch-sensing submodule and the third carrier substrate have a third release film therebetween; S4: utilizing the second release film to remove the second carrier substrate from the second touch-sensing submodule; S5: utilizing a first bonding layer to attach the first touch-sensing submodule to the second touch-sensing submodule; S6: utilizing the first release film to remove the first carrier substrate from the first touch-sensing submodule; S7: applying a second bonding layer to attach a flexible cover plate having a decorative area onto the first flexible touch sensing module, and the second bonding layer is located between the flexible cover plate and the first flexible touch-sensing component; and S8: utilizing the third release film to remove the third carrier substrate.

Preferably, the flexible cover plate comprises a film layer and a shielding layer disposed on the film layer, and the shielding layer forms the decorative area.

Preferably, the step of applying a second bonding layer to attach a flexible cover plate onto the first flexible touch sensing module comprises: attaching the second bonding layer to the film layer and the shielding layer; and attaching the film layer and the shielding layer to the first flexible touch-sensing component through the second bonding layer.

Preferably, the second bonding layer is disposed between the first flexible touch-sensing component and the first release film. After the step of removing the first release film, the second bonding layer is exposed, and then the flexible cover plate is attached to the exposed second bonding layer.

Preferably, the first flexible touch-sensing component and the second flexible touch-sensing component are film-type sensors.

Preferably, the metal nanowire conductive layer is electrically connected to a peripheral circuit, and the peripheral circuit is shielded by the shielding layer.

Preferably, attaching the first bonding layer to the first flexible touch sensing module of the first touch-sensing submodule is performed, and then attaching the second touch-sensing submodule to the first touch-sensing submodule through the first bonding layer is performed.

Preferably, the second release film is entirely removed or partially removed in step of releasing the second release film, and the first release film is entirely removed or partially removed in step of releasing the first release film.

Preferably, the method further comprises forming a flexible electrode component on the second flexible touch-sensing component or the first flexible touch-sensing component. The flexible electrode component is electrically insulating from the second flexible touch-sensing component or the first flexible touch-sensing component.

The embodiments of the present disclosure provide a method for manufacturing a touch panel, comprising: S1: providing a first touch-sensing submodule, S1 comprising: S1-1: forming a first release film on a first carrier substrate; S1-2: forming a shielding layer and a first flexible touch-sensing component on the first release film, and the shielding layer is integrated with the first flexible touch-sensing component; S2: providing a second touch-sensing submodule, S2 comprising: S2-1: forming a second release film on a second carrier substrate; S2-2: forming a second flexible touch-sensing component on the second release film; S3: forming a third carrier substrate on the second touch-sensing submodule, and the second touch-sensing submodule and the third carrier substrate have a third release film therebetween; S4: utilizing the second release film to remove the second carrier substrate from the second touch-sensing submodule; S5: utilizing a first bonding layer to attach the first touch-sensing submodule to the second touch-sensing submodule; S6: utilizing the first release film to remove the first carrier substrate from the first touch-sensing submodule; S7: applying a second bonding layer to attach a flexible cover plate onto the first flexible touch sensing module, and the second bonding layer is located between the flexible cover plate and the first flexible touch-sensing component; and S8: utilizing the third release film to remove the third carrier substrate.

Preferably, the shielding layer is formed by printing a colored material on the first flexible touch-sensing component.

Preferably, the step of attaching a flexible cover plate onto the first flexible touch sensing module comprises: attaching the second bonding layer to the flexible cover plate; and then attaching the flexible cover plate with the second bonding layer to the first flexible touch-sensing component and the shielding layer.

Preferably, the second bonding layer is disposed between the first flexible touch-sensing component and the first release film. After the step of removing the first release film, the second bonding layer is exposed, and the flexible cover plate is attached to the exposed second bonding layer.

Preferably, the first bonding layer is disposed between the second release film and the second flexible touch-sensing component. After the step of removing the second release film, the first bonding layer is exposed, and the first touch-sensing submodule is attached to the second touch-sensing submodule through the exposed first bonding layer.

Preferably, the step of attaching the first touch-sensing submodule to the second touch-sensing submodule further comprises: attaching the first bonding layer to the first flexible touch sensing module of the first touch-sensing submodule, and then attaching the second touch-sensing submodule to the first touch-sensing submodule through the first bonding layer.

The embodiments of the present disclosure provide a touch panel, comprising: a first touch-sensing submodule, comprising: a protective carrier substrate; a first flexible touch-sensing component, wherein the first flexible touch-sensing component and the protective carrier substrate have a release film therebetween; a second touch-sensing submodule, comprising: a carrier substrate; a second flexible touch-sensing component, wherein the second flexible touch-sensing component and the carrier substrate have an another release film therebetween; a first bonding layer, wherein the first touch-sensing submodule is attached to the second touch-sensing submodule through the first bonding layer to form a touch sensor.

Preferably, the carrier substrate is releasably attached to the second flexible touch-sensing component through the release film.

Preferably, a remaining release film disposed on the second flexible touch-sensing component.

Preferably, a flexible electrode component is located between the second flexible touch-sensing component and the release film. The first overcoat layer of the second flexible touch-sensing component is located between the flexible electrode component and the first silver nanowire layer of the second flexible touch-sensing component so that the flexible electrode component is electrically insulating from the first silver nanowire layer of the second flexible touch-sensing component.

The embodiments of the present disclosure provide a touch sensor, comprising: a first touch-sensing submodule, comprising: a protective carrier substrate; a first flexible touch-sensing component, wherein the first flexible touch-sensing component and the protective carrier substrate have a release film therebetween; a second touch-sensing submodule, comprising: a carrier substrate; a second flexible touch-sensing component, wherein the second flexible touch-sensing component and the carrier substrate have an another release film therebetween; and a first bonding layer, wherein the first touch-sensing submodule is attached to the second touch-sensing submodule through the first bonding layer to form a touch sensor.

The embodiments of the present disclosure provide a touch panel used for transferring to a non-planar surface, comprising: a first touch-sensing submodule, comprising: a first flexible touch-sensing component; a second touch-sensing submodule, comprising: a second flexible touch-sensing component, wherein the second flexible touch-sensing component and the first flexible touch-sensing component have a first bonding layer therebetween; and a flexible cover plate having a decorative area, wherein the first flexible touch-sensing component and the flexible cover plate have a second bonding layer therebetween.

Preferably, the flexible cover plate comprises a film layer and a shielding layer disposed on the film layer, and the shielding layer forms the decorative area.

Preferably, the second flexible touch-sensing component further comprises a hard coating layer, and the hard coating layer is disposed on a first surface of the metal nanowire conductive layer, and the first surface is opposite to a second surface of the metal nanowire conductive layer on which is the first bonding layer formed.

Preferably, a first portion of a first release film remaining on the first flexible touch-sensing component is included after the first release film is partially released. The first portion of the first release film is located between the first flexible touch-sensing component and the second bonding layer. A second portion of a second release film remaining on the second flexible touch-sensing component is included after the second release film is partially released. The second portion of the second release film is located between the second flexible touch-sensing component and the first bonding layer.

Preferably, a flexible electrode component is located on the second flexible touch-sensing component, and the overcoat layer/hardcoat layer/protective layer of the second flexible touch-sensing component is located between the flexible electrode component and the silver nanowire layer of the second flexible touch-sensing component so that the flexible electrode component is electrically insulating from the silver nanowire layer of the second flexible touch-sensing component.

The embodiments of the present disclosure provide a touch panel used for transferring to a non-planar surface, comprising: a first touch-sensing submodule, comprising: a shielding layer and a first flexible touch-sensing component, wherein the shielding layer is integrated with the first flexible touch-sensing component; a second touch-sensing submodule, comprising: a second flexible touch-sensing component, wherein the second flexible touch-sensing component and the first flexible touch-sensing component have a first bonding layer therebetween; and a flexible cover plate, wherein the first flexible touch-sensing component and the flexible cover plate have a second bonding layer therebetween.

Preferably, the shielding layer is a colored material layer printed on the first flexible touch-sensing component.

Preferably, the second flexible touch-sensing component further comprises a hard coating layer, and the hard coating layer and the first bonding layer are formed on opposite surfaces of the metal nanowire conductive layer.

Preferably, a remaining portion of the first release film remaining on the first flexible touch-sensing component is formed after the first release film is partially released. The remaining portion of the first release film is located between the first flexible touch-sensing component and the second bonding layer. A remaining portion of the second release film remaining on the second flexible touch-sensing component is formed after the second release film is partially released. The remaining portion of the second release film is located between the second flexible touch-sensing component and the first bonding layer.

Preferably, a flexible electrode component is located on the second flexible touch-sensing component. The flexible electrode component is patterned or un-patterned.

The embodiments of the present disclosure provide a method for manufacturing a touch panel, S1: providing a first touch-sensing submodule, S1 comprising: S1-1: forming a first release film on a first carrier substrate; S1-2: forming a flexible cover plate having a decorative area on the first release film; S1-3: forming a first flexible touch-sensing component on the flexible cover plate; S2: providing a second touch-sensing submodule, S2 comprising: S2-1: forming a second release film on a second carrier substrate; S2-2: forming a second flexible touch-sensing component on the second release film; S3: forming a third carrier substrate on the second touch-sensing submodule, and the second touch-sensing submodule and the third carrier substrate have a third release film therebetween; S4: releasing the second release film to remove the second carrier substrate from the second touch-sensing submodule; S5: utilizing a first bonding layer to attach the first touch-sensing submodule to the second touch-sensing submodule; S6: releasing the first release film to remove the first carrier substrate from the first touch-sensing submodule so that the flexible cover plate is exposed; and S7: releasing the third release film to remove the third carrier substrate.

Preferably, the flexible cover plate comprises a film layer and a shielding layer disposed on the film layer, and the shielding layer forms the decorative area.

Preferably, the second release film is entirely removed or partially removed, and the first release film is entirely removed.

The embodiments of the present disclosure provide a touch panel, comprising: a first touch-sensing submodule, comprising: a flexible cover plate having a decorative area and a first flexible touch-sensing component, wherein the first flexible touch-sensing component is in direct contact with the flexible cover plate having a decorative function; and a second touch-sensing submodule, comprising: a second flexible touch-sensing component, wherein the second flexible touch-sensing component and the first flexible touch-sensing component have a first bonding layer therebetween.

A touch sensor, a touch panel and method for forming the same are provided. A flexible touch-sensing component is formed on a release film due to the support provided by a first carrier substrate and/or a second carrier substrate. Then, the flexible touch-sensing component can be attached onto planar, non-planar and curved cover plate through the transferring and reloading of the third carrier substrate, such that the touch panel formed can be much lighter and thinner, and have a lower process cost. In addition, the flexible touch-sensing component uses a film sensor including a metal nanowire conductive layer. Since the metal nanowire conductive layer, such as silver nanowire layer has flexibility, the touch sensor and the touch panel provided in the present disclosure can be used in flexible touch-sensing devices or the products with curved surface. Furthermore, the material of the bonding layer can be an adhesive reactive ink, and the released touch panel can be directly attached to target substrates without adding a layer of optical glue or hydrogel, such that the touch panel can be lighter and thinner, and have better optical properties, such as high transmittance and low haze.

A touch sensor, a touch panel and method for forming the same are provided. The touch sensor and the touch panel provided can have multiple layers (two-layer, tri-layer or even more) of electrode components with flexibility. Therefore, various sensing functions or electromagnetic shielding functions are available. As a result, the touch sensor, the touch panel provided in the present disclosure can be lighter, thinner and flexible while having competitive advantage in the marketplace.

DETAILED DESCRIPTION

Figure 1A:
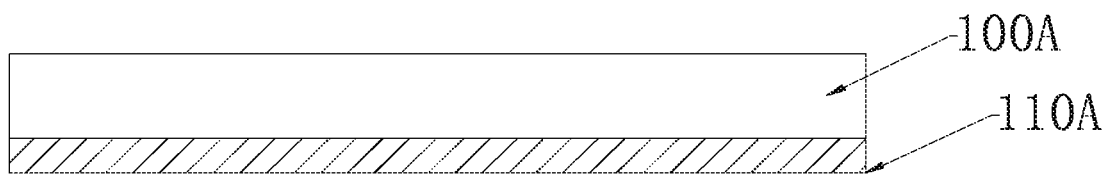
FIGS. 1A-1D illustrate a process flow for manufacturing a touch sensor in accordance with an embodiment of the present disclosure.

A detailed description is given in the following embodiments with reference to the accompanying drawings.

The present disclosure may repeat reference numerals and/or letters in some various embodiments. This repetition does not in itself dictate a relationship between some various embodiments or figures. In addition, the formation of a component over, on or below another component in the description that follows includes embodiments in which the two components are formed in direct contact, and may also include embodiments in which additional components may be formed between the two components. The components can be illustrated at any scale to simplify and clarify the figures. It should be noted that, in the present disclosure, the terms, such as "first," "second" and the like, may be used herein for ease of description to describe the manufacturing processes, and these are not related to the numbers or the orders. For example, "first release layer" and "second release layer" can be both realized as "a release layer".

Figure 1B:
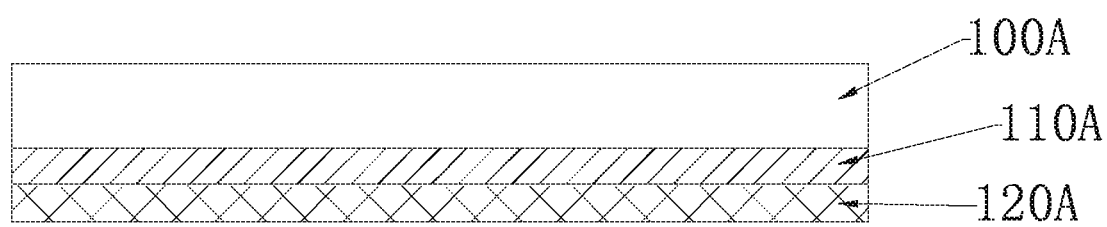
Figure 1C:
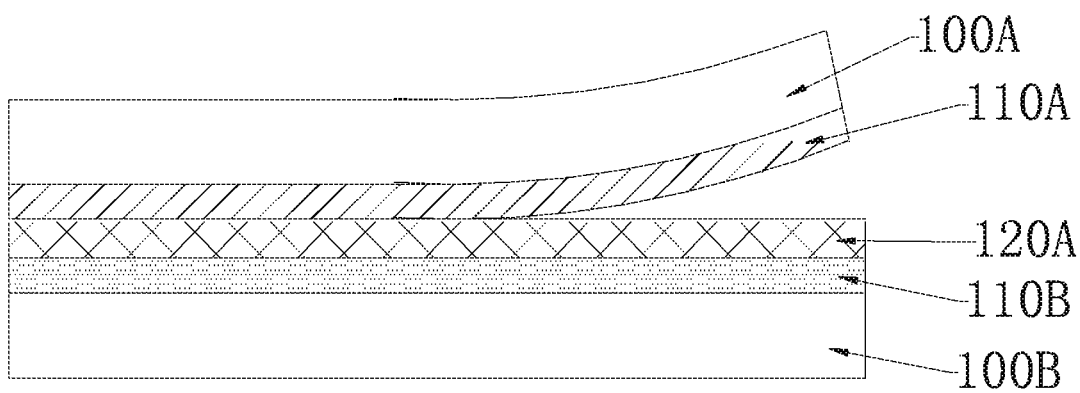
Figure 1D:
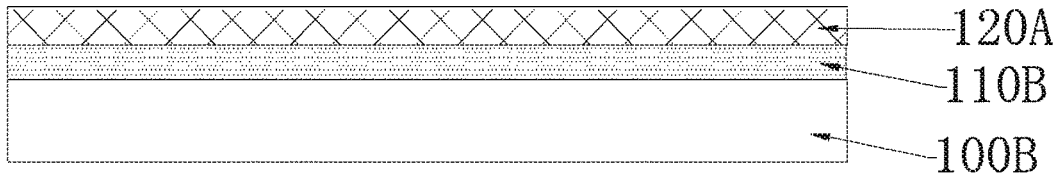
Figure 1E:
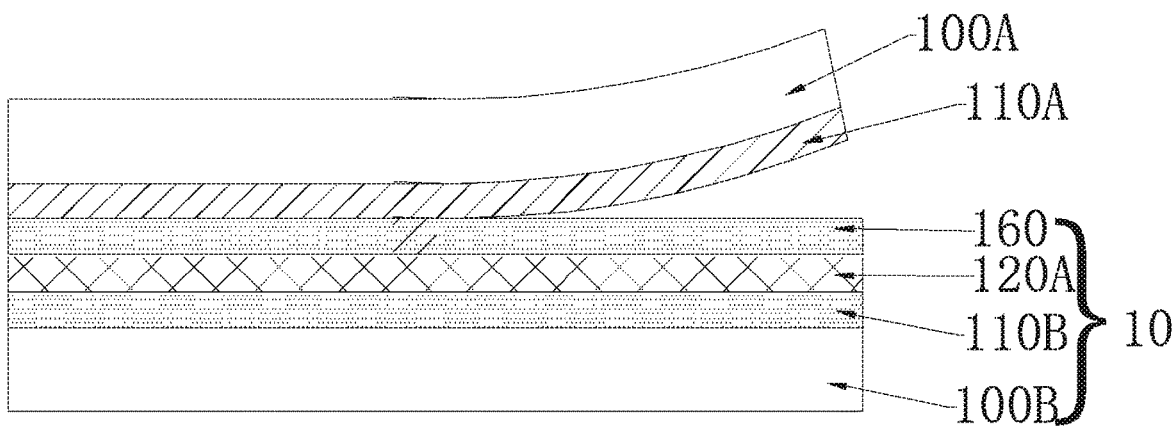
FIG. 1E illustrates a touch-sensing submodule in accordance with an embodiment of the present disclosure.

FIGS. 1A-1D illustrate a process flow for manufacturing a touch-sensing submodule in accordance with an embodiment of the present disclosure, wherein FIG. 1D is a representation of the specific structure of the touch-sensing submodule formed by a manufacturing method in accordance with an embodiment of the present disclosure. FIG. 1E shows another touch-sensing submodule of the present disclosure.

Referring to FIG. 1A, a first substrate 100A is provided, and a first release layer 110A is formed on the first substrate 100A. The first substrate 100A may provide mechanical support or protection function to the structures/layers/products formed in the subsequent steps. Therefore, the first substrate 100A can also be called a protective substrate or a protective carrier. The first substrate 100A can be a temporary platform for manufacturing a touch-sensing submodule 10 thereon, and the touch-sensing submodule 10 can be removed from the first substrate 100A in the following steps when needed. The first substrate 100A may be made of a transparent or a non-transparent insulating material. The first substrate 100A may be a rigid substrate, such as a glass substrate or a flexible substrate. Since the first substrate 100A is not a part of the product for an end user, the first substrate 100A is preferably made of a material which has a lower cost, as long as it can provide necessary mechanical support. For example, the material of the first substrate 100A may be row glass rather than a chemically strengthened glass so as to reduce the process/material cost of the touch panels. Moreover, the first substrate 100A may be formed by plastics, resins or common flexible materials, such as polycarbonate (PC), polymethyl methacrylate (PMMA), polyethylene terephthalate (PET), or other polyesters, polyether sulfone (PES), polyimide (PI), cellulose ester, benzocyclobutene (BCB), polyvinyl chloride (PVC), acrylic acid resin or the like. In addition, after removing the first substrate 100A from the touch-sensing submodule 10 in the subsequent steps, the first substrate 100A can be recycled and reused. By doing so, the process cost can be further reduced. It is worth noting that the material of the first substrate 100A is not limited to glass, plastic, resin, or such flexible substrates, but can be any applicable material that can provide mechanical support or protection. The first release layer 110A may be formed by film layers constructed by materials having release ability. The "release" discussed herein and below means removing the first substrate 100A from the other layers (such as the first release layer 110A) which are originally attached to the first substrate 100A, or removing the first substrate 100A and the first release layer 110A together from the other layers originally attached to the first release layer 110A. The material of the first release layer 110A may be an organic material, such as polyimide (PI), polypropene (PP), polystryene (PS), acrylonitrile butadiene styrene (ABS), polyethylene terephthalate (PET), polyvinyl chloride (PVC), polycarbonate (PC), polyethylene (PE), polymethyl methacrylate (PMMA), polytetrafluoroethylene (PTFE), cyclo-olefin polymer (COP, Arton) or a combination thereof. The first release film 110A may be formed on the first substrate 100A by coating solutions on the first substrate 100A and then performing a curing/drying step. Moreover, the first release film 110A may be formed by vapor deposition, roll-to-roll (RTR) or another applicable method, or by directly pressing a dry-film layer of the first release film 110A onto the first substrate 100A. In an embodiment, the first release layer 110A may be attached to the first substrate 100A though a removable adhesive. The removable adhesive may include non-water soluble glue, or another applicable material that attach two layers temporarily with each other and then can be dissolved or removed by suitable methods. In an embodiment, by dissolving the removable adhesive, the first substrate 100A can be entirely removed or partially removed from the first release film 110A. Preferably, the first release film 110A may be a composite film with an upper layer formed by a material having release ability and a lower layer formed by material without release ability. The upper layer of the first release film 110A refers to the layer which is far from the surface of the first substrate 100A, and the lower layer of the first release film 110A refers to the layer which is close to the surface of the first substrate 100A. Therefore, when the first release film 110A is the above-mentioned composite film, the first substrate 100A and the first release layer 110A can be removed together from the object originally attached to the upper layer of the first release layer 110A. If the first substrate 100A and the first release layer 110A are removed together in processes of forming the touch-sensing submodule, the touch-sensing submodule 10 can be lighter and thinner while having better optical properties, such as high transmittance and low haze.

Referring to FIG. 1B, a flexible touch-sensing component 120A is formed on the first release layer 110A, and the first release layer 110A is located between the first substrate 100A and the flexible touch-sensing component 120A. The flexible touch-sensing component 120A is a film sensor, which is also called as a film-type sensor, and the flexible touch-sensing component 120A may include a thin film and a transferrable transparent conductive film attached to the thin film. The film sensor is flexible or deformable. In other words, the shape/morphology of the film sensor can temperately or permanently become curved or bent.

Afterwards, referring to FIG. 1C, a second substrate 100B is formed on the flexible touch-sensing component 120A. There is further a second release layer 110B disposed between the flexible touch-sensing component 120A and the second substrate 100B. In an embodiment, the second release layer 110B and the first release layer 110A are both film layers having release ability. The second release layer 110B may be a composite film as well as the first release layer 110A. However, the chemical compositions of the second release layer 110B and the first release layer 110A may be the same or different. The material of the second substrate 100B and the material of the first substrate 100A may be the same or different. The second substrate 100B may be removed from the layers/object (such as the flexible touch-sensing component 120A) which are originally attached to the second substrate 100B by releasing the second release layer 110B, or the second substrate 100B and the second release layer 110B may be removed together from the layers/object originally attached to the second release layer 110B by releasing the second release layer 110B. In the embodiment, the second substrate 100B is used for loading or carrying object. Therefore, the second substrate 100B can be called a loading substrate. The material of the second substrate 100B may be a film material having high supporting strength. Thus, the second substrate 100B can also be called a carrier film or a loading film.

Then, referring to FIG. 1D, the first substrate 100A is removed by releasing the first release layer 110A to form the touch-sensing submodule 10. The first substrate 100A is removed to make preparation for transferring the touch-sensing submodule 10 to a target, for example, a non-planar target substrate or a planar target substrate. In an embodiment, the target substrate may be a curved cover lens or a curved cover plate. The curved cover plate may be rigid, semi-rigid, flexible or deformable. A rigid cover lens may be permanently formed as the curved cover lens or as a planar lens. The semi-rigid, flexible or deformable substrate can be temperately treated as a curved lens or a partially curved lens or a planar cover lens. The first substrate 100A can be removed by chemical etching using chemicals, such as hydrogen fluoride (HF). Alternatively, the first substrate 100A can be removed by mechanical methods or a combination of chemical-mechanical methods. Preferably, the first substrate 100A and the first release layer 110A may be removed together, such that the touch-sensing submodule 10 can be lighter and thinner, and have better optical properties, such as high transmittance and low haze.

The touch-sensing submodule 10 shown in FIG. 1D or FIG. 1E may be formed through the aforementioned steps. As shown in FIG. 1D, the top of the figure is the touch and observe surface for the users, and the touch-sensing submodule 10 includes the flexible touch-sensing component 120A, the second release layer 110B, and the second substrate 100B stacked from top to bottom. As shown in FIG. 1E, the top of the figure is the touch and observe surface for the users, and the touch-sensing submodule 10 of another embodiment includes a bonding layer 160, the flexible touch-sensing component 120A, the second release layer 110B, and the second substrate 100B stacked from top to bottom. It should be noted that the "second" release layer described herein is merely to illustrate the aforementioned processes and is not related to the number or the order in which it is performed. Therefore, it can be simplified to and realized as a release layer located between the flexible touch-sensing component 120A and the substrate 100B. Details of the structures, materials and manufacturing methods of the aforementioned components are described in the aforementioned paragraphs, and are not repeated herein. The touch-sensing submodule 10 can be applied in computer systems, mobile phones, digital media players, tablet computers, ultra-slim-border laptops, wearable touch control devices, automotive touch systems, and other touch display devices.

Figure 2A:
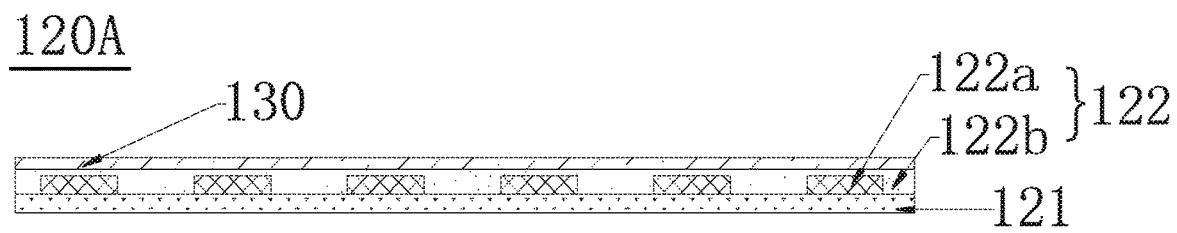
FIG. 2A illustrates a representation of a film sensor in accordance with an embodiment of the present disclosure.

Referring to FIG. 2A. FIG. 2A illustrates a representation of a specific structure of a film sensor in accordance with an embodiment of the present disclosure. In an embodiment, the film sensor has a film 121 and a metal nanowire conductive layer 122 formed on the film 121. The metal nanowire conductive layer 122 includes a metal nanowire layer and an overcoat layer (OC) 122b. The metal nanowire layer may be a silver nanowire layer 122a, and the overcoat layer (OC) 122b may enhance the characteristics, such as durability of the silver nanowire layer 122a. The silver nanowire layer 122a can be electrically connected to a peripheral circuit (not shown) so that the film sensor and the external circuit are connected through a flexible circuit board (FCB) for transmitting signals. The film sensor may be formed by depositing multiple metal nanowires, which are distributed in a fluid or ink, on the film 121 through the process, such as a stripe coating, a screen coating, a printing, a laminating or a roll-to-roll (RTR) process. The network layer of the metal nanowires is formed on a substrate through the drying of the fluid, and then, the metal nanowires conductive layer 122 is formed by patterning the network layer of the metal nanowires. In another embodiment, the metal nanowires conductive layer 122 is an un-patterned layer of the metal nanowires. In addition, a surface pretreatment can be performed on the film 121 in advance, so that the metal nanowires deposited subsequently can be firmly attached onto the surface of the film 121. The surface pretreatment of the film 121 can provided several functions. For example, the metal nanowires can be evenly deposited so that they can be secured on the film 121 in high degree of connection. The overcoat layer (OC) may be called as a matrix which is formed by an optical transparent polymer material. The polymer material may include, but not limited to, polymethacrylate (such as polymethyl methacrylate), polyacrylics of polyacrylate and polyacrylonitrile, polyvinyl alcohol, polyester (such as polyethylene terephthalate (PET), polyethylene naphthalate and polycarbonate), polymers with high aromaticity such as bakelite or cresol-formaldehyde, polystyrene, polyvinyl toluene, polyvinyl xylene, polyimide, polyamide, polyamideimide, polyetherimide, polysulfide, polysulfone, polyphenylene, polyphenylene oxide, polyurethane (PU), epoxy, polyolefin (such as polypropylene, polymethylpentene, or cyclic olefin), acrylonitrile butadiene styrene (ABS), cellulose, silicone, or another silicon-containing polymer (such as polysilsesquioxane), polyvinyl chloride (PVC), polyacetate, polynorbornene, synthetic rubber (such as EPR, SBR, EPDM), fluorine-containing polymer (such as polyvinylidene fluoride, polytetrafluoroethylene (TFE) or polyhexafluoropropylene), copolymer of fluoro olefin and hydrocarbon olefin, amorphous fluorocarbon polymer or copolymer.

In an embodiment, a passivation layer, a hard coating layer (HC) or a protective layer (Primer) 130 is further disposed on the metal nanowire conductive layer 122. For example, the passivation layer or the protective layer (Primer) 130 is located between the metal nanowire conductive layer 122 and the first release layer 110A. The aforementioned three kinds of layers can be alternatively used, or collectively used to protect the metal nanowire conductive layer 122. Especially, the silver nanowire layer 122a of the metal nanowire conductive layer 122 is prevented from being oxidized, and the metal nanowire conductive layer 122 is prevented from being scratched or worn. In an embodiment, the metal nanowire conductive layer 122 may be directly formed on the passivation layer or the protective layer (Primer) 130. Generally, the passivation layer, the hard coating layer, or the protective layer (Primer) 130 is flexible so that the touch-sensing submodule 10 which includes these layers are capable for attaching on a desired object, such as a curved surface. The flexible material may include but not limited to polyester, polyethylene terephthalate (PET), polybutylene terephthalate, polymethyl methacrylate (PMMA), acrylic acid resin, polycarbonate (PC), polystyrene, triacetate cellulose (TAC), polyvinyl alcohol, polyvinyl chloride, polyvinylidene chloride, polyethylene, ethylene-vinyl acetate copolymer, polyvinyl butyral, metal ion-crosslinked ethylene-methacrylic acid copolymer, polyurethane, glassine, polyolefin or the like. Preferably, the material of the passivation layer, the hard coating layer, or the protective layer (Primer) 130 may have higher physical strength, for example but not limited to polyethylene terephthalate (PET), polycarbonate (PC), polybutylene terephthalate, polymethyl methacrylate (PMMA), or TAC.

Figure 2B:
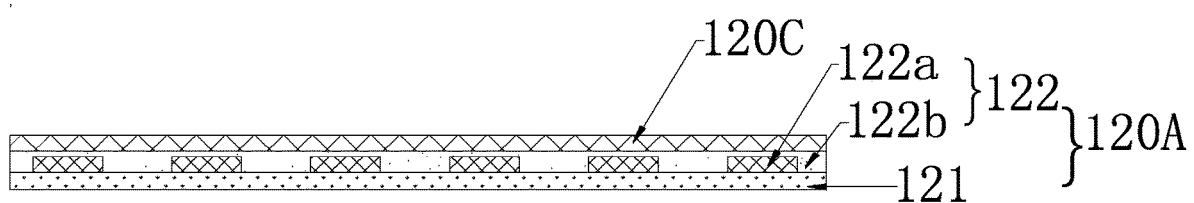
FIG. 2B illustrates a representation of a film sensor in accordance with another embodiment of the present disclosure.

In another embodiment, after forming the flexible touch-sensing component 120A on the first release layer 110A, the steps of forming a flexible electrode component 120C on the flexible touch-sensing components 120A (referring to FIG. 2B) are further included. The flexible electrode component 120C is flexible or deformable. That is, the shape of the flexible electrode component 120C can temperately or permanently become curved. The details of the flexible electrode component 120C can refer to the flexible touch-sensing component 120A. In other words, similarly, the flexible electrode component 120C have a film 121 and a metal nanowire conductive layer 122 formed on the film 121. The metal nanowire conductive layer 122 includes a silver nanowire layer 122a and an overcoat layer (OC) 122b. In an embodiment, the flexible electrode component 120C can be manufactured by the forming method of the film sensor described above. The film 121 is formed on the protective layer 130/the passivation layer/the hard coating layer of the flexible touch-sensing component 120A, and then, the silver nanowire layer 122a and the overcoat layer (OC) 122b are formed to construct the flexible electrode component 120C. Alternatively, the silver nanowire layer 122a and the overcoat layer (OC) 122b can be directly formed on the protective layer 130/the passivation layer/the hard coating layer over the flexible touch-sensing component 120A by the method described above to construct the flexible electrode component 120C. In other words, the film 121 of the flexible electrode component 120C may be omitted. Further alternatively, the silver nanowire layer 122a and the overcoat layer (OC) 122b can be directly formed on the overcoat layer (OC) 122b of the flexible touch-sensing component 120A by the method described above to construct the flexible electrode component 120C. Further alternatively, the film 121 can be directly formed on the overcoat layer (OC) 122b of the flexible touch-sensing component 120A, and then the silver nanowire layer 122a and the overcoat layer (OC) 122b can be formed by the method described above to construct the flexible electrode component 120C. It should be understood that the flexible electrode component 120C and the flexible touch-sensing component 120A are electrically isolated from each other. For example, the overcoat layer (OC) 122b of the flexible touch-sensing component 120A is used to electrically isolate the flexible electrode component 120C and the nano-metal conductive layer 122 of the flexible touch-sensing component 120A. Specifically, the thickness of the overcoat layer (OC) 122b may be increased enough to generate a space without network of nanowires. In an embodiment, the silver nanowire layer 122a of the metal nanowire conductive layer 122 can be embedded in the lower portion of overcoat layer (OC) 122b and extends in an orientation along the direction of the plane (i.e. perpendicular to the direction of the thickness). Therefore, the metal nanowire conductive layer 122 can have a planar (i.e. perpendicular to the direction of the thickness) conductivity rather than the conductivity parallel to the direction of the thickness. As a result, a conductive path may not be formed between the nano-metal conductive layer 122 of the flexible touch-sensing component 120A and the flexible electrode component 120C disposed thereon. Still alternatively, the protective layer 130 may be used to electrically isolate the flexible electrode component 120C and the nano-metal conductive layer 122 of the flexible touch-sensing component 120A. As discussed, the protective layer 130 can be replaced by the hard coating layer (HC), the passivation layer, another insulating layer, or a combination thereof. For example, the overcoat layer (OC) 122b described above, the film 121 described above or another insulating layer/film/substrate can be used to electrically isolate the flexible electrode component 120C and the flexible touch-sensing component 120A. The flexible electrode component 120C may be patterned for sensing the touch with the flexible touch-sensing component 120A.

Preferably, a passivation layer, a protective layer (Primer) 130 or a hard coating layer (HC) is further disposed on the metal nanowire conductive layer 122 of the flexible electrode component 120C.

In an embodiment, the flexible electrode component 120C may be a film electrode component, which may include a film and a transferable transparent conductive film attached to the film. In an embodiment, the film is formed on the passivation layer over the flexible touch-sensing component 120A, and then the transferable transparent conductive film is attached onto the film to construct the flexible electrode component 120C. Alternatively, the transferable transparent conductive film may be directly attached onto the passivation layer over the flexible touch-sensing component 120A to construct the flexible electrode component 120C.

However, it is not necessary to pattern the metal nanowire conductive layer 122 of the flexible electrode component 120C by a patterning process (e.g. an etching step). Therefore, the metal nanowire conductive layer 122 of the flexible electrode component 120C can be coated on the entire surface of the object, such that the flexible electrode component 120C can performs as an electrode layer for shielding electrical signals. As a result, electromagnetic interference (EMI) can be achieved so as to improve the ratio of signal to noise. Alternatively, the metal nanowire conductive layer 122 of the flexible electrode component 120C may be patterned to have desired sensing functions, for example the flexible electrode component 120C may sense capacitive change, pressure, or sense the convex or concave surface of the objects or the like.

FIGS. 3-7 illustrate a process flow for manufacturing a touch sensor in accordance with another embodiment of the present disclosure. For the sake of illustration, the terms "carrier base," "release film", etc . . . are used in the present embodiment. Although the terms are different from the "carrier substrate," "release layer" used in the aforementioned embodiments, the true meanings of them can be cross-referenced to realize the content.

Figure 3A:
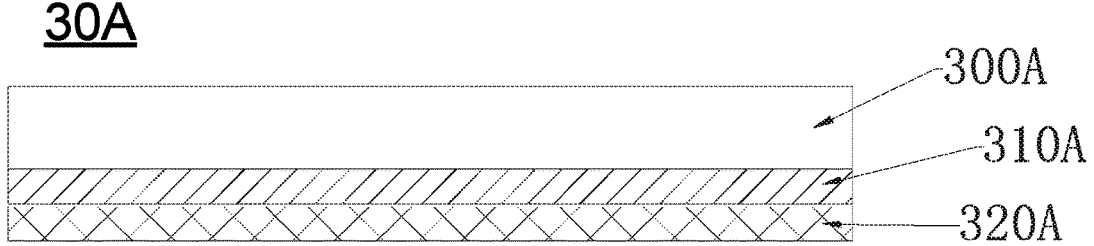
FIG. 3A illustrates a step of providing a first touch-sensing submodule in accordance with an embodiment of the present disclosure.
Figure 3B:
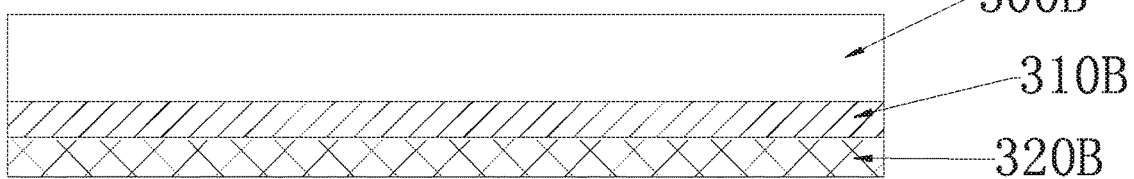
FIG. 3B illustrates a step of providing a second touch-sensing submodule in accordance with an embodiment of the present disclosure.

Referring to FIGS. 3A and 3B, first, a first touch-sensing submodule 30A and a second touch-sensing submodule 30B are provided. The first touch-sensing submodule 30A may be formed by the following steps. For example, a first release film 310A is formed on a first carrier base 300A, and then, a first flexible touch-sensing component 320A is formed on the first release film 310A. Similarly, referring to FIG. 3B, the second touch-sensing submodule 30B may be formed by the following steps. For example, a second release film 310B is formed on a second carrier base 300B, and then, a second flexible touch-sensing component 320B is formed on the second release film 310B. The details of the terms "carrier base," "release film" and "flexible touch-sensing component" in this embodiment may refer to the aforementioned embodiments, and are not repeated herein.

Figure 4:
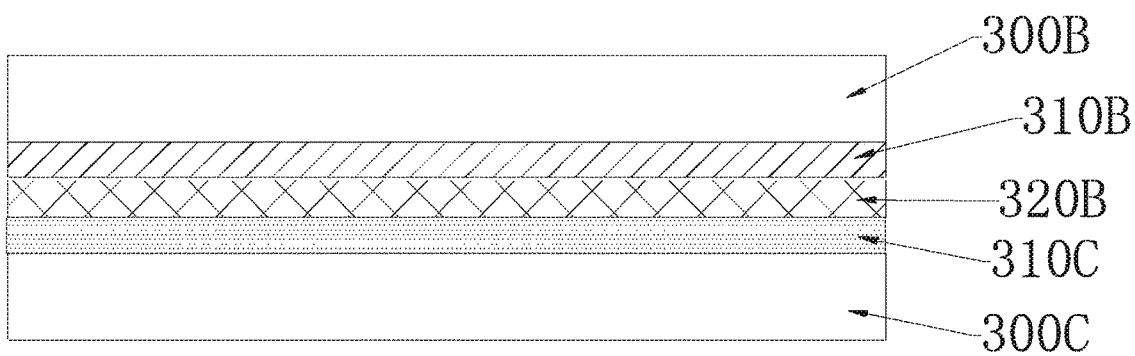
FIG. 4 illustrates a step of forming a third carrier substrate on the second touch-sensing submodule in accordance with an embodiment of the present disclosure.

Next, referring to FIG. 4, a third carrier base 300C is formed on the second touch-sensing submodule 30B, and a third release film 310C is disposed between the second touch-sensing submodule 30B and the third carrier base 300C. Specifically, the second flexible touch-sensing component 320B of the second touch-sensing submodule 30B has a top surface and a bottom surface. The second release film 310B and the second carrier base 300B are located on the top surface of the second flexible touch-sensing component 320B in sequence. The third release film 310C is disposed on the bottom surface of the second flexible touch-sensing component 320B, and the third carrier base 300C is further attached to the third release film 310C. Accordingly, the third carrier base 300C is removably attached to the second flexible touch-sensing component 320B through the third release film 310C. In this embodiment, the third carrier base 300C is used for loading or carrying object. Therefore, the third carrier base 300C can be called a loading base. The material of the third carrier base 300C may be a film material having high supporting strength. Thus, the third carrier base 300C can also be called a carrier film or a loading film.

Figure 5:
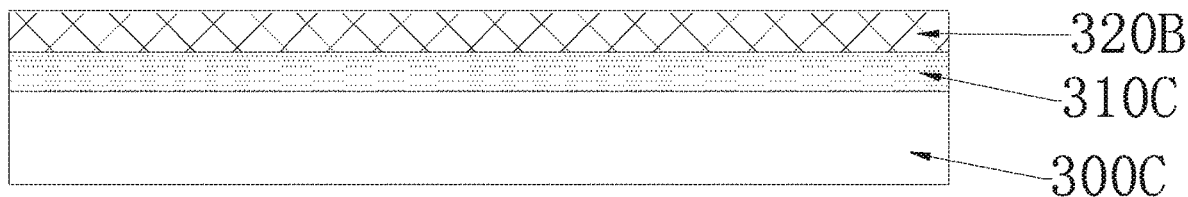
FIG. 5 illustrates a step of releasing the second carrier substrate from the second touch-sensing submodule in accordance with an embodiment of the present disclosure.

Afterwards, referring to FIG. 5, the second carrier base 300B is removed from the second touch-sensing submodule 30B through the second release film 310B. In this step, the second release film 310B may be entirely removed or partially removed. If the second release film 310B is entirely removed, the thickness of the component can be decreased. However, if the second release film 310B are partially removed and partially remained on the second touch-sensing submodule 30B, a removal/clean operation can be omitted, and the process cost can be reduced. In other words, in the embodiments of the present disclosure, the second release film 310B can be left or not, and this can be adjusted according to actual application.

Figure 6:
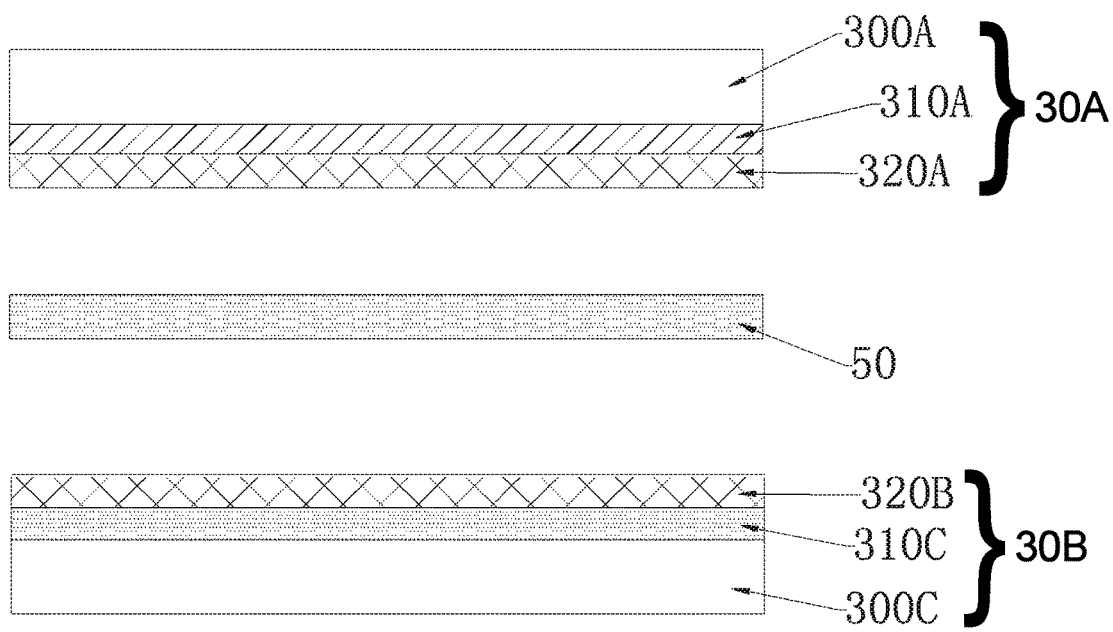
FIG. 6 illustrates a step of attaching the second touch-sensing submodule with the first touch-sensing submodule by a bonding layer in accordance with an embodiment of the present disclosure.

Then, referring to FIG. 6, the first touch-sensing submodule 30A is attached to the second touch-sensing submodule 30B through a first bonding layer 50. Since the second carrier base 300B has already been removed, the first bonding layer 50 can be used to attach the first flexible touch-sensing component 320A to the second flexible touch-sensing component 320B, and the first bonding layer 50 can be further used to electrically isolate the first flexible touch-sensing component 320A from the second flexible touch-sensing component 320B. Therefore, the first flexible touch-sensing component 320A and the second flexible touch-sensing component 320B can be respectively configured to receive driving signals sent by external controllers and to transmit touch sensing signals, when a mutual capacitance variation generates, back to external controllers. In an embodiment, the first bonding layer 50 may be disposed between the second release film 310B and the second flexible touch-sensing component 320B in advance. After the step of removing the second release film 310B, the first bonding layer 50 is exposed, and the first touch-sensing submodule 30A can be attached to the second touch-sensing submodule 30B through the exposed first bonding layer 50. The material of the first bonding layer 50 may be an adhesive reactive ink. The removing of the second release film 310B from the reactive ink will not affect the adhesion of the reactive ink. Therefore, the released second touch-sensing submodule 30B can be attached to any target i.e., a non-planar substrate or a planar substrate without adding a layer of optical glue or hydrogel glue, such that the products such as touch panel can be lighter and thinner, and have better optical properties, such as high transmittance and low haze. Alternatively, the first bonding layer 50 can be attached to the first flexible touch-sensing component 320A, and then, the second flexible touch-sensing component 320B can be further attached to the first bonding layer 50. In this embodiment, the material of the first bonding layer 50 may be an adhesive reactive ink, an optical glue layer or a hydrogel glue layer.

Figure 7A:
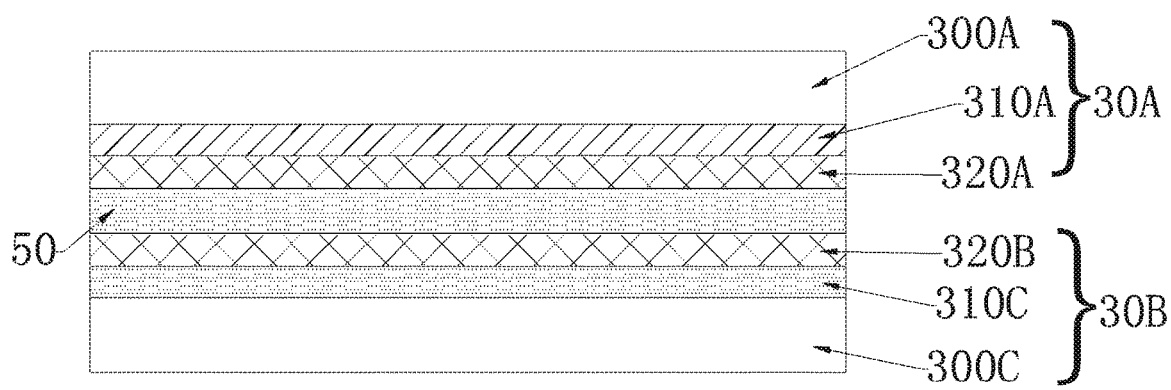
FIG. 7A illustrates a film sensor of the touch sensor in accordance with an embodiment of the present disclosure.
Figure 7B:
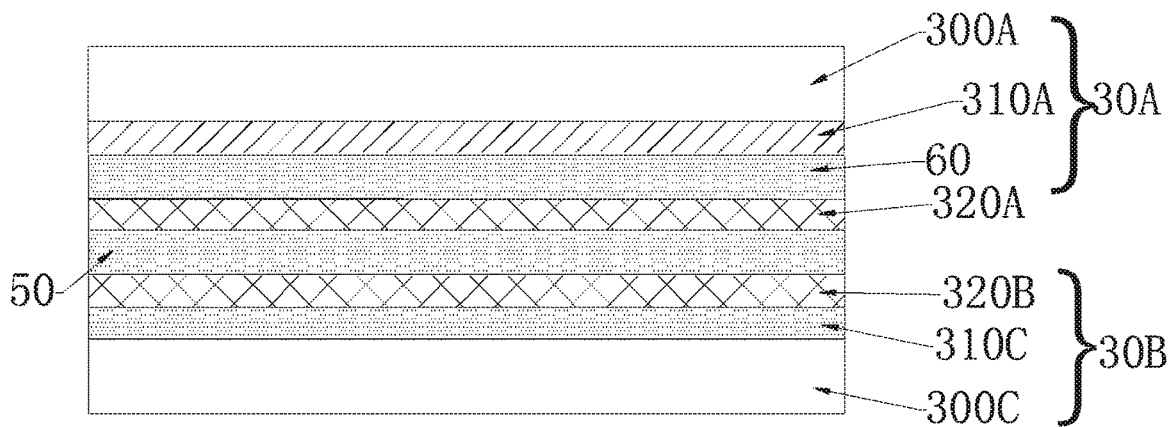
FIG. 7B illustrates a film sensor of the touch sensor in accordance with another embodiment of the present disclosure.

Referring to FIG. 7A, the touch sensor of an embodiment of the present disclosure is shown. The touch sensor includes the first touch-sensing submodule 30A, the second touch-sensing submodule 30B and the first bonding layer 50 which is used to attach and fix the two touch-sensing submodules. The first touch-sensing submodule 30A includes the protective carrier substrate (i.e. the first carrier base 300A), the first flexible touch-sensing component 320A, and the release film (i.e. the first release film 310A) between the first flexible touch-sensing component 320A and the first carrier base 300A. The second touch-sensing submodule 30B includes the loading substrate (i.e. the third carrier base 300C), the second flexible touch-sensing component 320B, and another release film (i.e. the third release film 310C) between the second flexible touch-sensing component 320B and the third carrier base 300C. The first bonding layer 50 is attached between the first flexible touch-sensing component 320A and the second flexible touch-sensing component 320B. Preferably, as the embodiment provided above, the first flexible touch-sensing component 320A and the second flexible touch-sensing component 320B may have passivation layers, protective layers (Primer) or hard coating layers (HC) arbitrarily disposed therein. For example, the second flexible touch-sensing component 320B may include a hard coating layer (HC). The hard coating layer (HC) may be disposed on the bottom surface of the second flexible touch-sensing component 320B to in direct contact with the third release film 310C. On the other hand, as shown in FIG. 7B, a second bonding layer 60 may be disposed between the first flexible touch-sensing component 320A and the first release film 310A to assemble the touch sensor in accordance with an embodiment of the present disclosure with a display device. In the touch sensor shown in FIG. 7A or FIG. 7B, a remaining release film disposed on the second flexible touch-sensing component 320B of the second touch-sensing submodule 30B is further included. The called remaining release film may be the second release film 310B that remains after the aforementioned step of removing the second carrier substrate 300B by releasing the second release film 310B), the remaining release film can be used to protect the second flexible touch-sensing component 320B of the second touch-sensing submodule 30B during the transfer process.

Figure 3C:
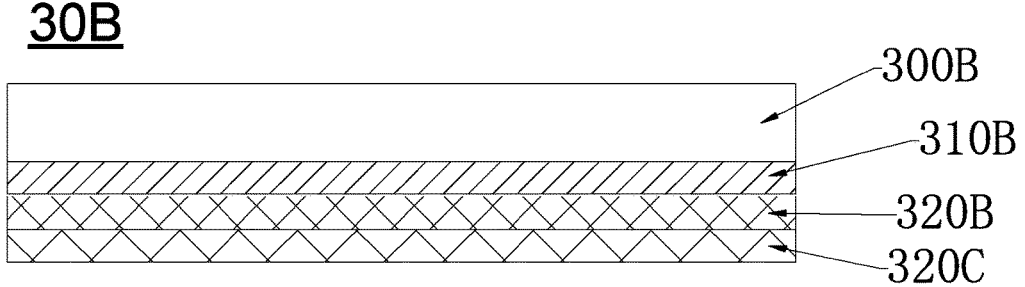
FIG. 3C illustrates a step of forming a flexible electrode component on the second flexible touch-sensing component in accordance with an embodiment of the present disclosure.
Figure 7C:
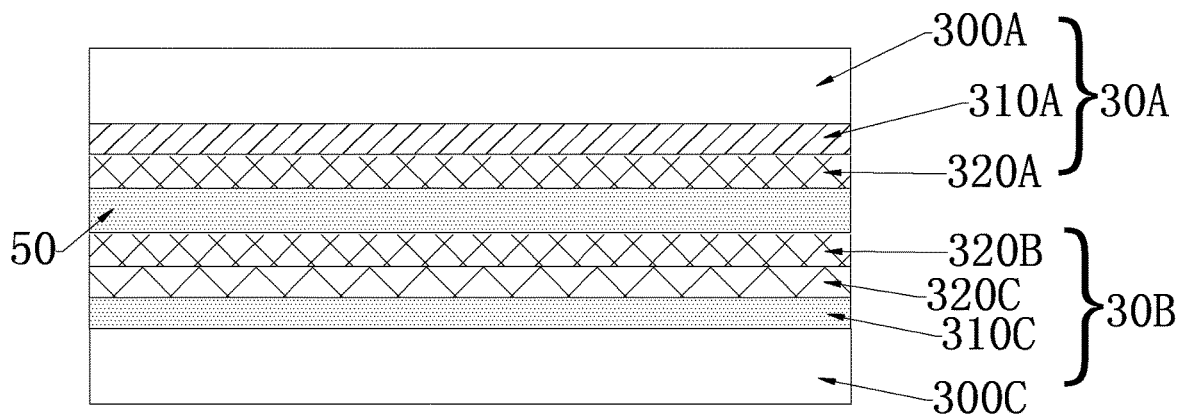
FIG. 7C illustrates a film sensor of the touch sensor in accordance with still another embodiment of the present disclosure.

Preferably, a flexible electrode component 320C disposed in the first touch-sensing submodule 30A and/or the second touch-sensing submodule 30B is further included. For example, a flexible electrode component 320C is disposed in the second touch-sensing submodule 30B. Specifically, after forming the second flexible touch-sensing component 320B on the second release film 310B, the step of forming a flexible electrode component 320C on the second flexible touch-sensing component 320B of the second touch-sensing submodule 30B (as shown in FIG. 3C) is performed. The flexible electrode component 320C is flexible or deformable. That is, the shape of the flexible electrode component 320C can become curved temperately or permanently. After the step of attaching the third carrier base 300C to the second touch-sensing submodule 30B through the third release film 310C, as shown in FIG. 7C, the flexible electrode component 320C is located between the third release film 310C and the second flexible touch-sensing component 320B. The details of the flexible electrode component 320C can refer to the flexible touch-sensing component 120A. In other words, similarly, the flexible electrode component 320C have a film 121 and a metal nanowire conductive layer 122 formed on the film 121. The metal nanowire conductive layer 122 may includes a silver nanowire layer 122a and an overcoat layer (OC) 122b. A passivation layer, a protective layer (Primer), or a hard coating layer (HC) may be further disposed on the nano-metal conductive layer 122. It is not necessary to pattern the metal nanowire conductive layer 122 of the flexible electrode component 320C by a patterning step e.g. an etching step. Therefore, the metal nanowire conductive layer 122 of the flexible electrode component 320C can be coated on the entire surface of the object and be grounded, such that the flexible electrode component 320C can perform as an electrode layer for shielding electrical signals. As a result, electromagnetic interference (EMI) can be achieved so as to improve the ratio of signal to noise. Alternatively, the metal nanowire conductive layer 122 of the flexible electrode component 320C may be patterned to have desired sensing functions, for example the flexible electrode component 120C may sense capacitive change, or pressure, or sense the convex or concave surface of the objects or the like. The flexible electrode component 320C may be a film-type electrode component, which may include a film and a transferable transparent conductive film attached to the film. Accordingly, referring to FIG. 7C, a touch sensor of another embodiment of the present disclosure is shown. The touch sensor shown in FIG. 7C includes the first touch-sensing submodule 30A, the second touch-sensing submodule 30B, and the first bonding layer 50 which is used to attach and fix the two touch-sensing submodules 30A and 30B. The first touch-sensing submodule 30A includes the protective carrier substrate (i.e. the first carrier base 300A), the first flexible touch-sensing component 320A and the release film (i.e. the first release film 310A) between the first flexible touch-sensing component 320A and the first carrier substrate 300A. The second touch-sensing submodule 30B includes the loading substrate (i.e. the third carrier base 300C), the flexible electrode component 320C and the second flexible touch-sensing component 320B. The flexible electrode component 320C is attached to the second flexible touch-sensing component 320B. Another release film (i.e. the third release film 310C) is disposed between the flexible electrode component 320C and the third carrier base 300C. The first bonding layer 50 is attached between the first flexible touch-sensing component 320A and the second flexible touch-sensing component 320B.

Figure 7D:
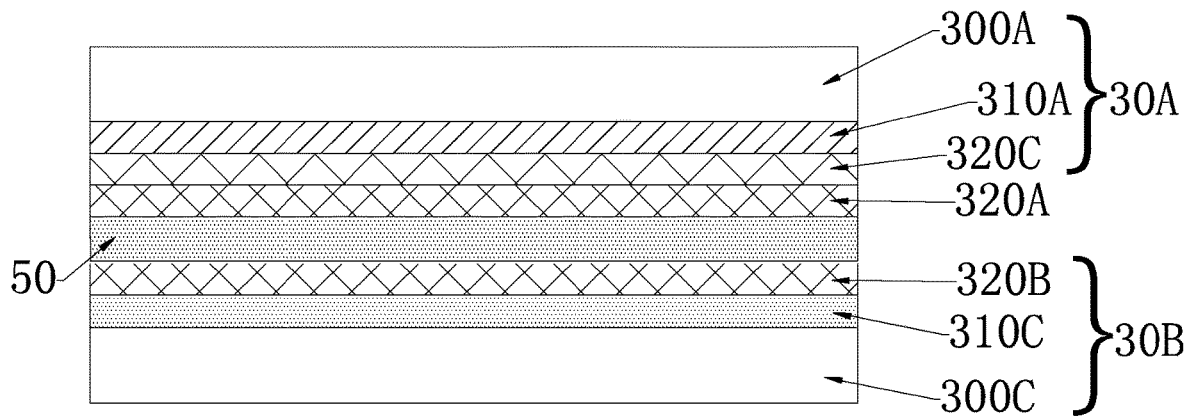
FIG. 7D illustrates a film sensor of the touch sensor in accordance with still another embodiment of the present disclosure.

Alternatively, the flexible electrode component 320C may be disposed in the first touch-sensing submodule 30A. Specifically, as shown in FIG. 7D, after forming the first release film 310A on the first carrier base 300A, a step of forming a flexible electrode component 320C on the first release film 310A of the first touch-sensing submodule 30A is included. In other words, the flexible electrode component 320C is located between the first release film 310A and the first flexible touch-sensing component 320A. The flexible electrode component 320C and the first carrier base 300A are located on opposite sides of the first release film 310A. The details of the flexible electrode component 320C can refer to the foregoing descriptions, and are not repeated herein. Accordingly, referring to FIG. 7D, a touch sensor of another embodiment of the present disclosure is shown. The touch sensor includes the first touch-sensing submodule 30A, the second touch-sensing submodule 30B and the first bonding layer 50 which is used to attach and fix the two touch-sensing submodules 30A and 30B. The first touch-sensing submodule 30A includes the protective carrier substrate (i.e. the first carrier base 300A), the flexible electrode component 320C, the first flexible touch-sensing component 320A, and the release film (i.e. the first release film 310A) between the flexible electrode component 320C and the first carrier base 300A. The second touch-sensing submodule 30B includes the loading substrate (i.e. the third carrier base 300C), the second flexible touch-sensing component 320B, and another release film (i.e. the third release film 310C) between the second flexible touch-sensing component 320B and the third carrier base 300C. The first bonding layer 50 is attached between the first flexible touch-sensing component 320A and the second flexible touch-sensing component 320B.

Figure 7E:
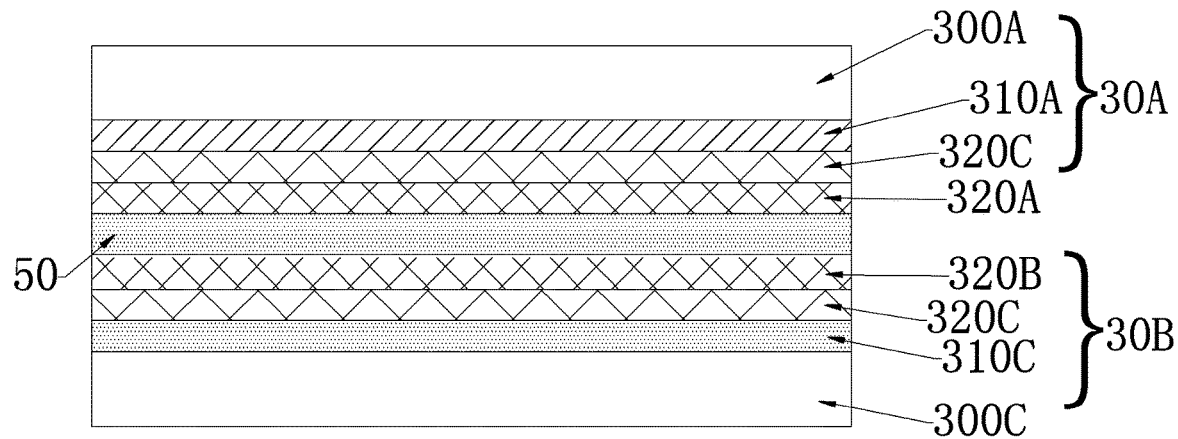
FIG. 7E illustrates a film sensor of the touch sensor in accordance with still another embodiment of the present disclosure.

Alternatively, the flexible electrode components 320C may be disposed in both of the first touch-sensing submodule 30A and the second touch-sensing submodule 30B. Specifically, as shown in FIG. 7E, a flexible electrode component 320C is formed on the first release film 310A of the first touch-sensing submodule 30A and the other flexible electrode component 320C is formed on the second flexible touch-sensing component 320B of the second touch-sensing submodule 30B. Therefore, a step of forming the flexible electrode component 320C on the first release film 310A and the second flexible touch-sensing component 320B is included. The details of the flexible electrode component 320C can refer to the foregoing descriptions, and are not repeated herein. Accordingly, referring to FIG. 7E, a touch sensor of another embodiment of the present disclosure is shown. The touch sensor includes the first touch-sensing submodule 30A, the second touch-sensing submodule 30B and the first bonding layer 50 which is used to attach and fix the two touch-sensing submodules 30A, 30B. The first touch-sensing submodule 30A includes the protective carrier substrate (i.e. the first carrier base 300A), the flexible electrode component 320C, the first flexible touch-sensing component 320A, and the release film (i.e. the first release film 310A) between the flexible electrode component 320C and the first carrier base 300A. The second touch-sensing submodule 30B includes the loading substrate (i.e. the third carrier base 300C), the flexible electrode component 320C, and the second flexible touch-sensing component 320B. The flexible electrode component 320C is attached to the second flexible touch-sensing component 320B. Another release film (i.e. the third release film 310C) is disposed between the flexible electrode component 320C and the third carrier base 300C, and the first bonding layer 50 is attached between the first flexible touch-sensing component 320A and the second flexible touch-sensing component 320B.

It should be understood that the flexible electrode component 320C is electrically isolated from the first flexible touch-sensing component 320A, and/or the flexible electrode component 320C is electrically isolated from the second flexible touch-sensing component 320B. For example, the protective layer 130 (or the passivation layer or the hard coating layer (HC)), the aforementioned film or another insulating layer can be used to electrically isolate the flexible electrode component 320C from the first flexible touch-sensing component 320A or the second flexible touch-sensing component 320B.

The processes of assembling a touch sensor into a touch panel in accordance with some embodiments of the present disclosure are illustrated below.

Figure 8:
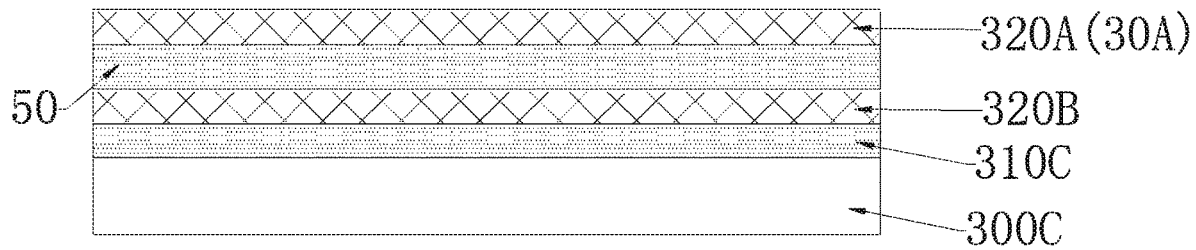
FIGS. 8-11 illustrate a process flow for assembling a touch sensor into a touch panel in accordance with an embodiment of the present disclosure.

As shown in FIG. 8, the first carrier base 300A is removed from the first touch-sensing submodule 30A by releasing the first release film 310A. As aforementioned, the first release film 310A may be entirely released or partially released from the first touch-sensing submodule 30A.

Figure 9:
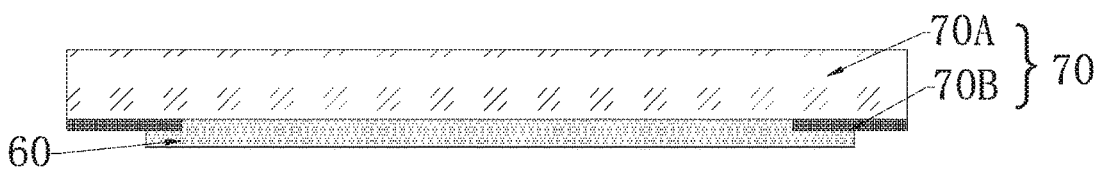
Figure 9:
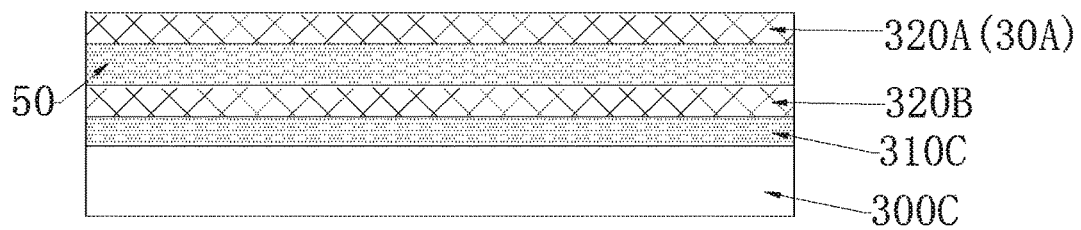

Next, referring to FIG. 9, a flexible cover plate 70 is attached to the first flexible touch-sensing component 320A through a second bonding layer 60, and the second bonding layer 60 is located between the flexible cover plate 70 and the first flexible touch-sensing component 320A. Preferably, the flexible cover plate 70 has a decorative function. For example, the flexible cover plate 70 has a decorative area. Specifically, the flexible cover plate 70 includes a film layer 70A and a shielding layer 70B (or called a decorative layer or a mask layer) disposed on the film layer 70A. The shielding layer 70B is located on at least one side of the film layer 70A, for example, the shielding layer 70B is a frame structure with an opening for displaying, and the frame structure performs as the decoration area to provide for the decorative function. The shielding layer 70B is configured to shield the peripheral circuit, such that the signal wires of the peripheral circuit may not be easily seen by users from the view side of the flexible cover plate 70. The shielding layer 70B is a colored material layer, and the material of the colored material layer may be a colored ink, colored photoresist or a combination thereof. The shielding layer 70B may be a single layer or a composite multilayer structure. For example, the single layer structure may be a black ink layer, and the composite multilayer structure may be a stacked structure of an ink layer and a photoresist layer, a stacked structure of a white ink layer and a black ink layer, or a stacked structure of a white ink layer, a black ink layer and a photoresist layer. The flexible cover plate 70 may be curved or deformable. The flexible cover plate 70 may temperately or permanently become curved or not curved. The flexible cover plate 70 may be formed by plastics, resins or the likely flexible material, such as polycarbonate (PC), polymethyl methacrylate (PMMA), polyethylene terephthalate (PET), polyester material, polyether sulfone (PES), polyimide (PI), cellulose ester, benzocyclobutene (BCB), polyvinyl chloride (PVC), acrylic acid resin or the like. In an embodiment, if the second bonding layer 60 has already been formed between the first flexible touch-sensing component 320A and the first release film 310A in advance, the second bonding layer 60 will be exposed after removing the first release film 310A. The flexible cover plate 70 can then be attached to the exposed second bonding layer 60. The material of the second bonding layer 60 may be an adhesive reactive ink. The removing of the first release film 310A from the reactive ink will not affect the adhesion of the reactive ink. Therefore, the released first touch-sensing submodule 30A can be directly attached to a non-planar or planar target substrate, e.g., a cover glass, through the reactive ink without adding an auxiliary layer of optical glue or hydrogel to construct a touch panel. As a result, the touch panel can be lighter and thinner, and have better optical properties, such as high transmittance and low haze. Alternatively, the second bonding layer 60 can be attached to the flexible cover plate 70, and then, the flexible cover plate 70 with the second bonding layer 60 can be further attached to the first flexible touch-sensing component 320A by the second bonding layer 60. In this embodiment, the material of the second bonding layer 60 may be an adhesive reactive ink, an optical glue layer or a hydrogel layer.

Afterwards, referring to FIG. 10, the third carrier base 300C is removed from the stackup by releasing the third release film 310.

As a result, the touch panel of an embodiment of the present disclosure is complete. The touch panel includes the flexible cover plate 70, the first touch-sensing submodule 30A, and the second touch-sensing submodule 30B bonded with the first touch-sensing submodule 30A by the first bonding layer 50. Moreover, the flexible cover plate 70 can be bonded or attached to the first touch-sensing submodule 30A through the second bonding layer 60. The first touch-sensing submodule 30A includes the first flexible touch-sensing component 320A, the second touch-sensing submodule 30B includes the second flexible touch-sensing component 320B, and the first bonding layer 50 is attached between the first flexible touch-sensing component 320A and the second flexible touch-sensing component 320B.

Figure 10A:
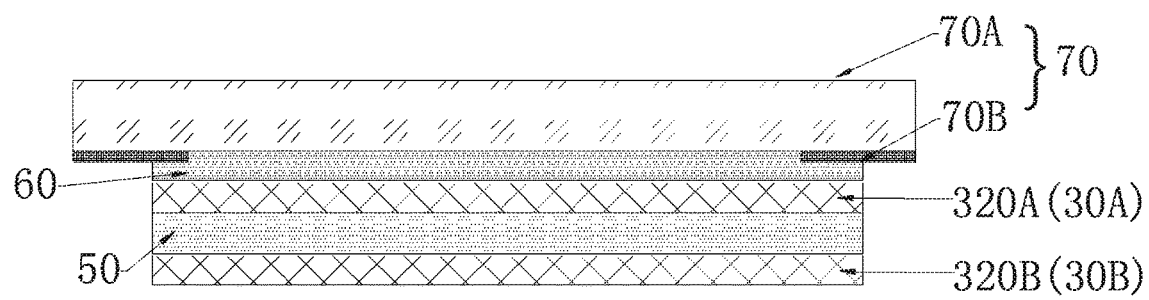
Figure 10B:
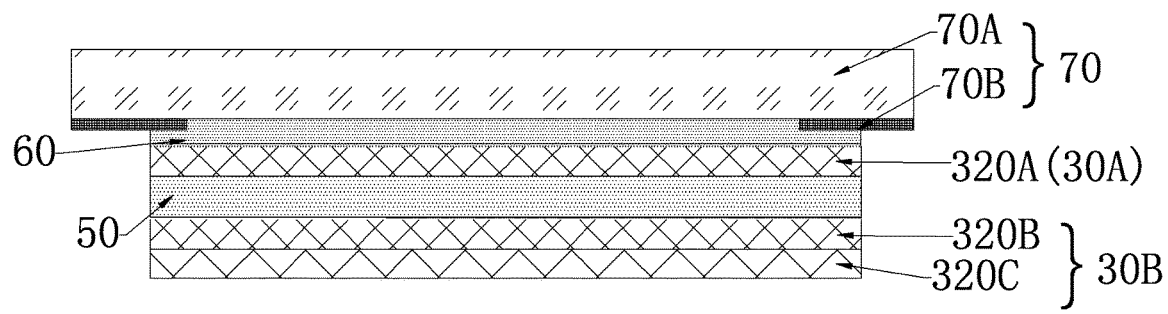

In another embodiment, the flexible electrode component 320C is attached to the second flexible touch-sensing component 320B, as shown in FIG. 10B. The flexible electrode component 320C and the first bonding layer 50 are located on opposite sides of the second flexible touch-sensing component 320B. The flexible electrode component 320C may include the passivation layer, the protective layer (Primer) or the hard coating layer (HC) disposed thereon. It is not necessary to pattern the metal nanowire conductive layer 122 of the flexible electrode component 320C by a patterning step e.g. an etching step. Therefore, the metal nanowire conductive layer 122 of the flexible electrode component 320C can be coated on the entire surface of the object and be grounded, such that the flexible electrode component 320C can perform as an electrode layer for shielding electrical signals. As a result, electromagnetic interference (EMI) can be achieved so as to improve the ratio of signal to noise. Alternatively, the metal nanowire conductive layer 122 of the flexible electrode component 320C may be patterned to have desired sensing functions, for example the flexible electrode component 120C may sense capacitive change, or pressure, or sense the convex or concave surface of the objects, or the like. The flexible electrode component 320C may be a film-type electrode component, which may include a film and a transferable transparent conductive film attached to the film. Accordingly, referring to FIG. 10B, a touch panel of another embodiment of the present disclosure includes the flexible cover plate 70, the first touch-sensing submodule 30A, and the second touch-sensing submodule 30B bonded/attached with the first touch-sensing submodule 30A by the first bonding layer 50. Moreover, the flexible cover plate 70 can be bonded or attached to the first touch-sensing submodule 30A through the second bonding layer 60. The first touch-sensing submodule 30A includes the first flexible touch-sensing component 320A, and the second touch-sensing submodule 30B includes the flexible electrode component 320C and the second flexible touch-sensing component 320B. The flexible electrode component 320C is attached to the second flexible touch-sensing component 320B, and the first bonding layer 50 is attached between the first flexible touch-sensing component 320A and the second flexible touch-sensing component 320B. The flexible electrode component 320C is used as the electrode layer for shielding electrical signals, after the touch panel of the embodiment of the present disclosure is assembled with a display module (not shown). For example, the flexible electrode component 320C disposed in the second touch-sensing submodule 30B is located between the display module and the touch sensing module (i.e. the combination of the first flexible touch-sensing component 320A and the second flexible touch-sensing component 320B). Therefore, electromagnetic interference can be prevented between the two modules.

Figure 10C:
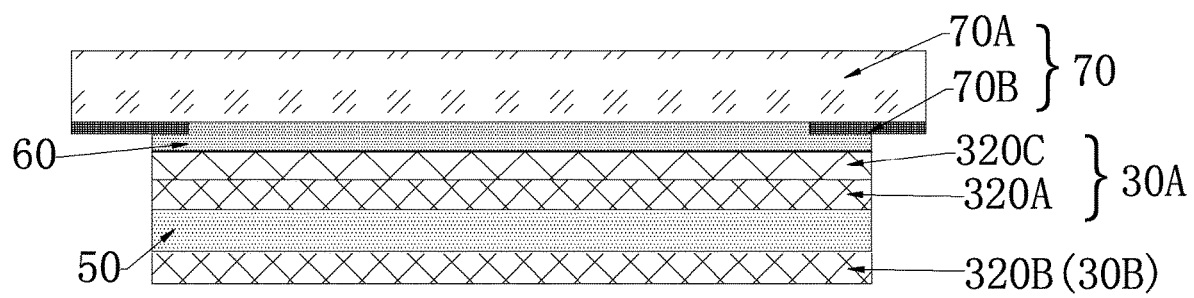

In another embodiment, referring to FIG. 10C, the flexible electrode component 320C is attached to the first release film 310A. The flexible electrode component 320C and the first carrier base 300A are located on opposite sides of the first release film 310A. After the first carrier base 300A is removed by releasing the first release film 310A, the flexible cover plate 70 can be bonded to the flexible electrode component 320C through the second bonding layer 60. The details of the flexible electrode component 320C can refer to the foregoing descriptions, and are not repeated herein. Accordingly, as shown in FIG. 10C, a touch panel of another embodiment includes the flexible cover plate 70, the first touch-sensing submodule 30A, and the second touch-sensing submodule 30B bonded with the first touch-sensing submodule 30A by the first bonding layer 50. Moreover, the flexible cover plate 70 can be bonded or attached to the first touch-sensing submodule 30A through the second bonding layer 60. The first touch-sensing submodule 30A includes the flexible electrode component 320C and the first flexible touch-sensing component 320A. The second bonding layer 60 is disposed between the flexible electrode component 320C and the flexible cover plate 70. The second touch-sensing submodule 30B includes the second flexible touch-sensing component 320B, and the first bonding layer 50 is attached between the first flexible touch-sensing component 320A and the second flexible touch-sensing component 320B. The flexible electrode component 320C is used as the electrode layer for shielding electrical signals. After the touch panel of the embodiment of the present disclosure is assembled with a display module (not shown), the flexible cover plate 70 performs as the interface which users touch. Therefore, the flexible electrode component 320C is located between the touch sensing module (i.e. the combination of the first flexible touch-sensing component 320A and the second flexible touch-sensing component 320B) and the external environment, and electromagnetic interference generated by the noise of external environment to the touch sensing module can be prevented.

Figure 10D:
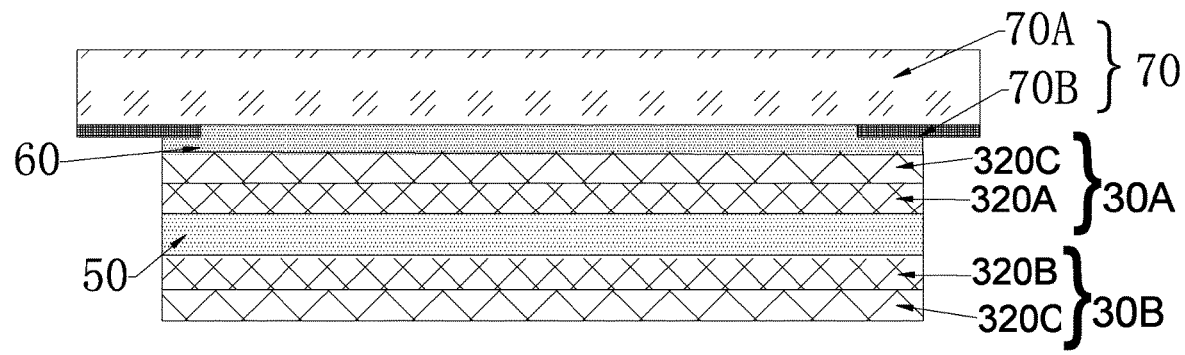

In another embodiment, as shown in FIG. 10D, both of the first touch-sensing submodule 30A and the second touch-sensing submodule 30B includes the flexible electrode components 320C. The details of the forming methods can refer to the foregoing descriptions. Accordingly, a touch panel of another embodiment of the present disclosure includes the flexible cover plate 70, the first touch-sensing submodule 30A, and the second touch-sensing submodule 30B bonded with the first touch-sensing submodule 30A by the first bonding layer 50, as provided in FIG. 10D. Moreover, the flexible cover plate 70 is bonded or attached to the first touch-sensing submodule 30A through the second bonding layer 60. The first touch-sensing submodule 30A includes a first flexible electrode component 320C and the first flexible touch-sensing component 320A, and the second bonding layer 60 is located between the first flexible electrode component 320C and the flexible cover plate 70. The second touch-sensing submodule 30B includes a second flexible electrode component 320C and the second flexible touch-sensing component 320B. The second flexible electrode component 320C is attached to the second flexible touch-sensing component 320B, and the first bonding layer 50 is attached between the first flexible touch-sensing component 320A and the second flexible touch-sensing component 320B. The flexible electrode component 320C is used as the electrode layer for shielding electrical signals. After the touch panel of the embodiment of the present disclosure is assembled with a display module (not shown), electromagnetic interference from the noise of external environment to the touch sensing module can be prevented, and electromagnetic interference between the display module and the touch sensing module can also be prevented.

It should be understood that the flexible electrode component 320C and the first flexible touch-sensing component 320A are electrically isolated from each other, and/or the flexible electrode component 320C and the second flexible touch-sensing component 320B are electrically isolated from each other. For example, the protective layer 130 (or the passivation layer or the hard coating layer (HC)), the aforementioned film or another insulating layer can be used to electrically isolate the flexible electrode component 320C from the first flexible touch-sensing component 320A or the second flexible touch-sensing component 320B. For example, the OC layer of the first flexible touch-sensing component 320A performs as an insulating medium for electrically isolating the metal nanowire layer of the first flexible touch-sensing component 320A from the flexible electrode component 320C.

Figure 11:
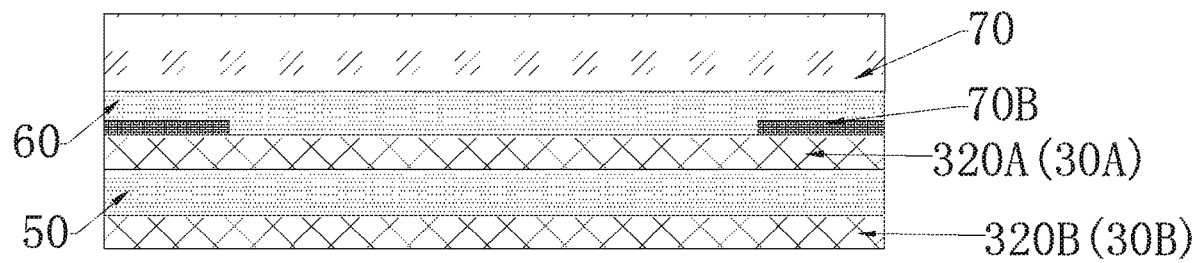

Referring to FIG. 11, a touch panel of another embodiment of the present disclosure is shown. In these embodiments, the flexible cover plate 70 is a cover plate with single-function for being an optical clear substrate (i.e. without decorative function), and the shielding layer 70B is integrated with the first flexible touch-sensing component 320A. The shielding layer 70B may at least cover a portion of the first flexible touch-sensing component 320A. Specifically, the shielding layer 70B is a mask layer formed by the colored material (such as ink) printed on the first flexible touch-sensing component 320A, for example, the shielding layer 70B is printed on the OC layer of the first flexible touch-sensing component 320A. However, in some other embodiments, the shielding layer 70B is formed/embedded in OC layer, the passivation layer, the protective layer (Primer) or the hard coating layer of the first flexible touch-sensing component 320A. The specific manufacturing method of these embodiments can refer to the illustration of the aforementioned embodiments.

In another embodiment, the flexible electrode component 320C is disposed in the first touch-sensing submodule 30A and/or the second touch-sensing submodule 30B, and the specific manufacturing method can refer to the illustration above. The shielding layer 70B is integrated with the second flexible touch-sensing component 320B or the flexible electrode component 320C. For example, the shielding layer 70B is printed on the OC layer of the second flexible touch-sensing component 320B or the flexible electrode component 320C. Alternatively, the shielding layer 70B is formed/embedded in OC layer, the passivation layer, the protective layer (Primer) or the hard coating layer of the second flexible touch-sensing component 320B, or the shielding layer 70B is formed/embedded in OC layer, the passivation layer, the protective layer (Primer) or the hard coating layer of flexible electrode component 320C.

In addition, the flexible cover plate 70 having a decorative function can be integrated into the first flexible touch-sensing component 320A. In other words, the flexible cover plate 70 with the shielding layer 70B is integrated into the first flexible touch-sensing component 320A. Therefore, the attaching step for bonding the flexible cover plate 70 with the first touch-sensing submodule 30A may be omitted, and the process cost can be reduced. The details of manufacturing method are provided below.

Figure 12A:
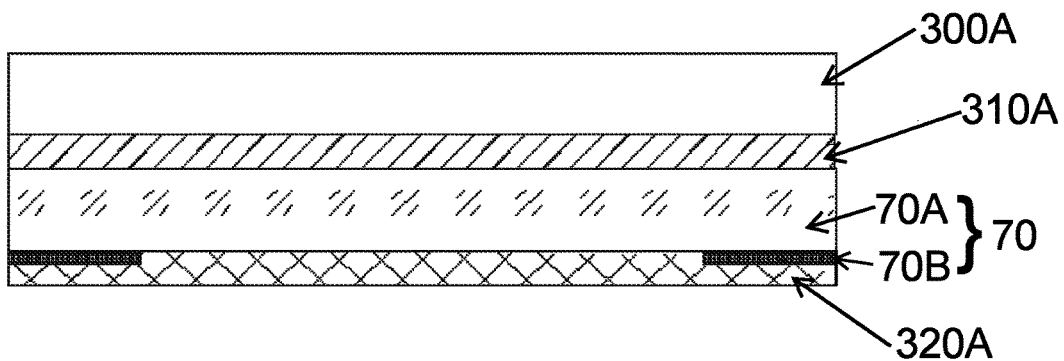
FIG. 12A illustrates a step of providing a first touch-sensing submodule in accordance with an embodiment of the present disclosure.
Figure 12B:
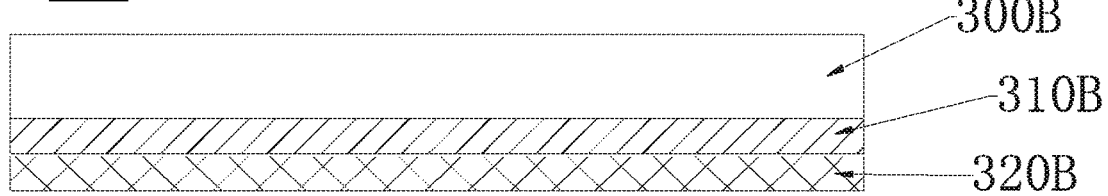
FIG. 12B illustrates a step of providing a second touch-sensing submodule in accordance with an embodiment of the present disclosure.

First, referring to FIGS. 12A and 12B, the first touch-sensing submodule 30A and the second touch-sensing submodule 30B are provided. The first touch-sensing submodule 30A may be formed by the following steps. For example, forming the first release film 310A on the first carrier base 300A, forming the flexible cover plate 70 having a decorative function on the first release film 310A, and forming the first flexible touch-sensing component 320A on the flexible cover plate 70. Similarly, the second touch-sensing submodule 30B may be formed by the following steps. For example, forming the second release film 310B on the second carrier base 300B, and forming the second flexible touch-sensing component 320B on the second release film 310B, as shown in FIG. 12B.

Figure 12C:
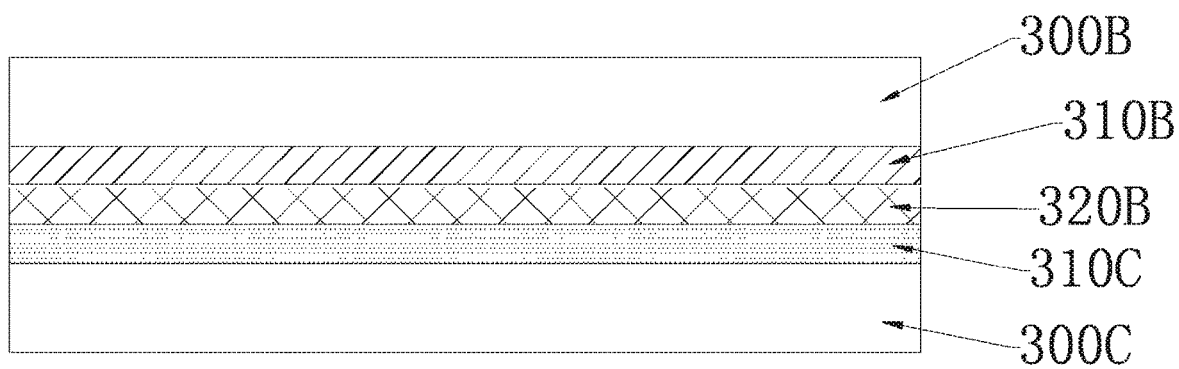
FIG. 12C illustrates a step of forming a flexible electrode component on the second flexible touch-sensing component in accordance with an embodiment of the present disclosure.

Next, referring to FIG. 12C, the third carrier base 300C is formed on the second touch-sensing submodule 30B, and the third release film 310C is disposed between the second touch-sensing submodule 30B and the third carrier base 300C. The details of step can refer to the illustrations provided in aforementioned embodiments.

Figure 12D:
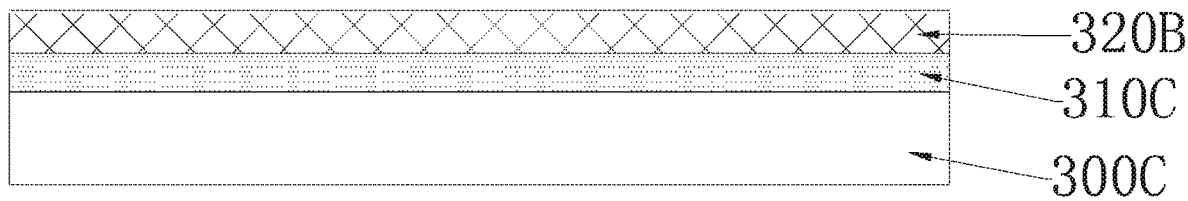
FIG. 12D illustrates a step of releasing the second carrier substrate from the second touch-sensing submodule in accordance with an embodiment of the present disclosure.

Afterwards, referring to FIG. 12D, the second carrier base 300B is removed from the second touch-sensing submodule 30B by releasing the second release film 310B. The details of step can refer to the illustrations provided in aforementioned embodiments.

Figure 13:
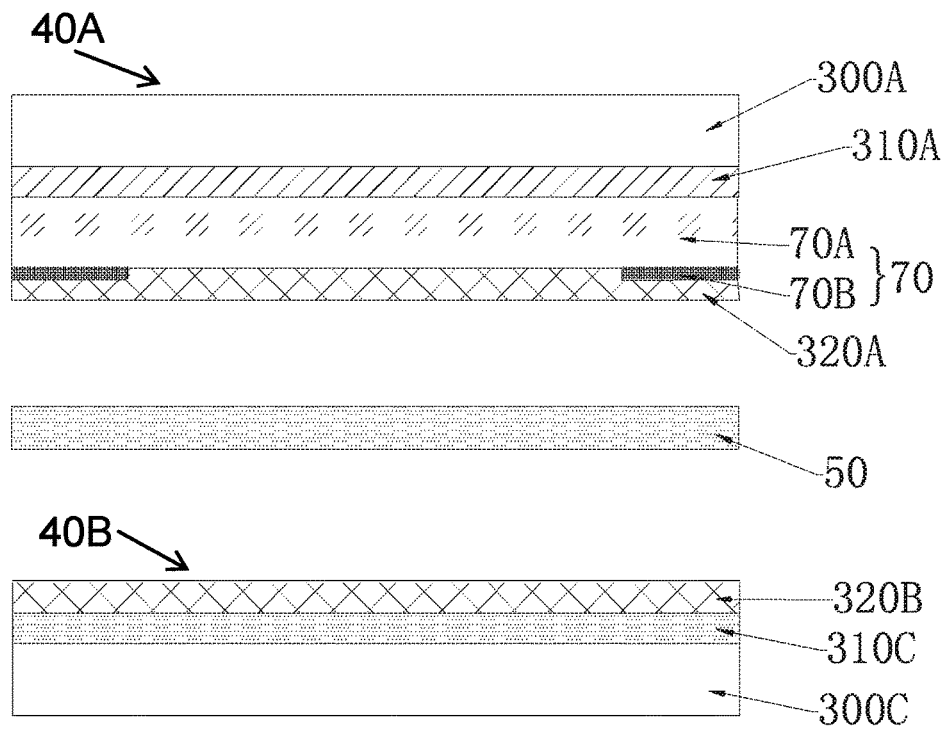
FIG. 13 illustrates a step of attaching the second touch-sensing submodule with the first touch-sensing submodule in accordance with an embodiment of the present disclosure.

Then, referring to FIG. 13, the first touch-sensing submodule 30A is attached to the second touch-sensing submodule 30B through the first bonding layer 50. The details of step can refer to the illustrations provided in aforementioned embodiments.

Figure 14:
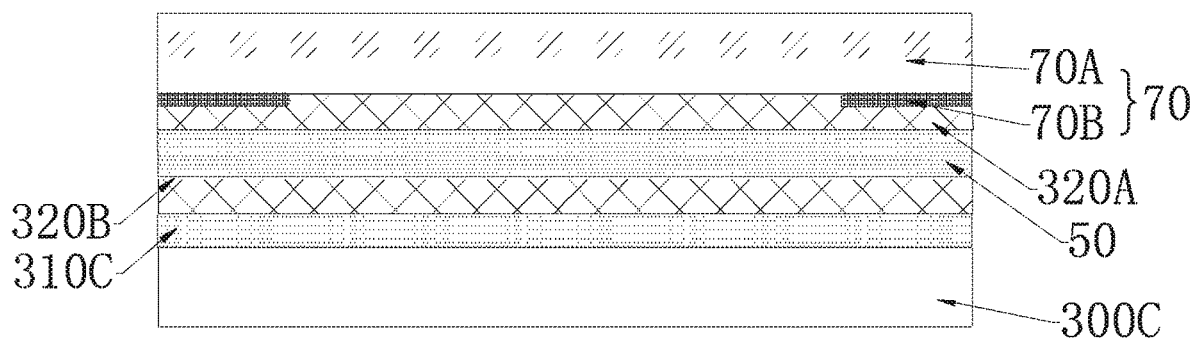
FIG. 14 illustrates a step of releasing the first carrier substrate from the first touch-sensing submodule in accordance with an embodiment of the present disclosure.

Subsequently, referring to FIG. 14, the first carrier substrate 300A is removed from the first touch-sensing submodule 30A by releasing the first release film 310A, such that the flexible cover plate 70 is exposed. In this step, since the flexible cover plate 70 is preferably exposed to provide a surface for user touch, the first release film 310A is preferably entirely removed or released.

Figure 15:
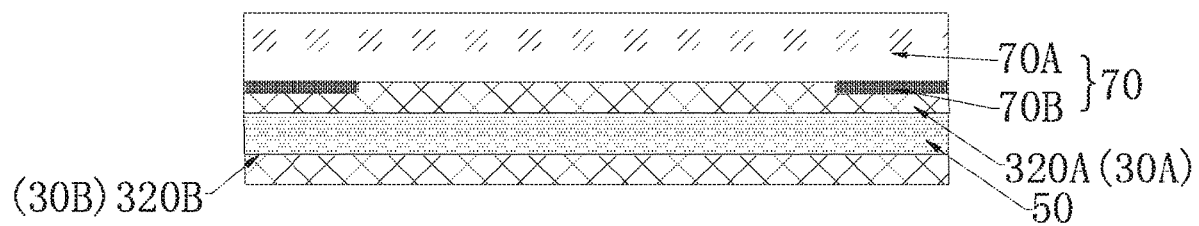
FIG. 15 illustrates a step of releasing the third carrier substrate for manufacturing a touch sensor in accordance with another embodiment of the present disclosure.

Finally, referring to FIG. 15, the third carrier base 300C is removed by releasing the third release film 310C. Similarly, the details of step can refer to the illustrations provided in aforementioned embodiments.

In some other embodiments, the flexible electrode component 320C may be disposed in the first touch-sensing submodule 30A and/or the second touch-sensing submodule 30B. The specific methods can refer to the illustration above.

Compared to the other aforementioned embodiments, the step for attaching the flexible cover plate 70 can be omitted in the embodiments of the present disclosure.

A touch sensor, a touch panel and a method for forming the same are provided. A flexible touch-sensing component is formed on a release film by support provided from a first carrier substrate or a second carrier substrate. Then, the flexible touch-sensing component is transferred to a third carrier substrate so as to further transfer the flexible touch-sensing component to a target. In other word, the flexible touch-sensing component can be attached onto a non-planar and curved cover plate through the loading of the third carrier substrate. After releasing the third carrier substrate, the flexible touch-sensing component is approximately attached to the non-planar and curved cover plate such that the touch panel formed can be much lighter and thinner, and have a lower process cost. Because the flexible touch-sensing component is close to the touches of user, the touch sensing accuracy may be improved. In addition, the flexible touch-sensing component comprises a film sensor including a metal nanowire conductive layer. The metal nanowire has flexibility, the touch sensor and the touch panel provided in the present disclosure can be flexible or deformable. Furthermore, the material of the bonding layer can be an adhesive reactive ink which keeps its adhesion after release films being released from the ink, so that the adhesive reactive ink can be used for directly attach two objects, e.g., the two touch-sensing submodules 30A, 30B, without adding a layer of optical glue or hydrogel. As a result, the touch panel formed by attaching components through the adhesive reactive ink as provided in the disclosure can be lighter and thinner, and have better optical properties, such as high transmittance and low haze.

The touch sensor and the touch panel provided can have multiple layers (two-layer, tri-layer or even more) of electrode components. The electrode components are flexible. Therefore, the electrode components can be applied on planar or non-planar surfaces (such as surfaces with curvatures). The functions of the electrode components can be adjusted according to different requirements, so that various sensing functions or electromagnetic shielding functions can be achieved. As a result, the touch sensor, the touch panel provided in the present disclosure can be flexible, and extensible while having competitive advantage in the marketplace. In addition, since the touch sensor and the touch panel provided in the present disclosure are flexible and extensible, they can be further applied in bendable displays, foldable displays or rollable displays.

While the disclosure has been described by way of example and in terms of the preferred embodiments, it should be understood that the disclosure is not limited to the disclosed embodiments. Any correction, substitution, modification which is made by following the spirits and principles of the present disclosure should be included in the scope protected by the present disclosure.

What is claimed is:
1. A method for manufacturing a touch panel, comprising:
S1: providing a first touch-sensing submodule, S1 comprising:
S1-1: forming a first release film on a first carrier substrate;
S1-2: forming a first flexible touch-sensing component on the first release film;
S2: providing a second touch-sensing submodule, S2 comprising:
S2-1: forming a second release film on a second carrier substrate;
S2-2: forming a second flexible touch-sensing component on the second release film;
S3: forming a third carrier substrate on the second touch-sensing submodule, and the second touch-sensing submodule and the third carrier substrate have a third release film therebetween;
S4: releasing the second release film to remove the second carrier substrate from the second touch-sensing submodule;
S5: utilizing a first bonding layer to attach the first touch-sensing submodule to the second touch-sensing submodule;
S6: releasing the first release film to remove the first carrier substrate from the first touch-sensing submodule;
S7: applying a second bonding layer to attach a flexible cover plate having a decorative area onto the first flexible touch sensing module, and wherein the second bonding layer is located between the flexible cover plate and the first flexible touch-sensing component; and
S8: releasing the third release film to remove the third carrier substrate.

2. The method for manufacturing the touch panel as claimed in claim 1, wherein the flexible cover plate comprises a film layer and a shielding layer disposed on the film layer, and wherein the shielding layer forms the decorative area.

3. The method for manufacturing the touch panel as claimed in claim 2, wherein S7 comprises:
attaching the second bonding layer to the film layer and the shielding layer; and
attaching the film layer and the shielding layer to the first flexible touch-sensing component through the second bonding layer.

4. The method for manufacturing the touch panel as claimed in claim 2, wherein the second bonding layer is disposed between the first flexible touch-sensing component and the first release film, and
wherein in S6, the second bonding layer is exposed after releasing the first release film, and
wherein in S7, the film layer and the shielding layer is attached to the exposed second bonding layer.

5. The method for manufacturing the touch panel as claimed in claim 2, wherein the first flexible touch-sensing component and the second flexible touch-sensing component are film-type sensors.

6. The method for manufacturing the touch panel as claimed in claim 5, wherein the film-type sensors comprise a film and a metal nanowire conductive layer formed on the film.

7. The method for manufacturing the touch panel as claimed in claim 6, wherein the metal nanowire conductive layer comprises a first silver nanowire layer and a first overcoat layer.

8. The method for manufacturing the touch panel as claimed in claim 5, wherein the film-type sensors comprise a film and a transferable transparent conductive film attached to the film.

9. The method for manufacturing the touch panel as claimed in claim 1, wherein the third carrier substrate is releasably attached to the second flexible touch-sensing component through the third release film.

10. The method for manufacturing the touch panel as claimed in claim 1, wherein the second flexible touch-sensing component further comprises a hard coating layer, and the hard coating layer is in contact with the third release film.

11. The method for manufacturing the touch panel as claimed in claim 1, wherein the first bonding layer is disposed between the second release film and the second flexible touch-sensing component, and
wherein in S4, the first bonding layer is exposed after releasing the second release film, and wherein in S5, the first touch-sensing submodule is attached to the second touch-sensing submodule through the exposed first bonding layer.

12. The method for manufacturing the touch panel as claimed in claim 1, wherein S5 further comprises:
attaching the first bonding layer to the first flexible touch sensing module, and attaching the second touch-sensing submodule to the first touch-sensing submodule through the first bonding layer.

13. The method for manufacturing the touch panel as claimed in claim 1, wherein S1 and S2 are performed by roll-to-roll processes.

14. The method for manufacturing the touch panel as claimed in claim 1, wherein the second release film is entirely released or partially released in S4, and the first release film is entirely released or partially released in S6.

15. The method for manufacturing the touch panel as claimed in claim 7, wherein S2 further comprises S2-3: forming a flexible electrode component on the second flexible touch-sensing component, and wherein the first overcoat layer of the second flexible touch-sensing component is located between the flexible electrode component and the first silver nanowire layer of the second flexible touch-sensing component so that the flexible electrode component is electrically insulating from the first silver nanowire layer of the second flexible touch-sensing component.

16. A method for manufacturing a touch panel, comprising:
S1: providing a first touch-sensing submodule, S1 comprising:
S1-1: forming a first release film on a first carrier substrate;
S1-2: forming a shielding layer and a first flexible touch-sensing component on the first release film, and the shielding layer is integrated with the first flexible touch-sensing component;
S2: providing a second touch-sensing submodule, S2 comprising:
S2-1: forming a second release film on a second carrier substrate;
S2-2: forming a second flexible touch-sensing component on the second release film;
S3: forming a third carrier substrate on the second touch-sensing submodule, and the second touch-sensing submodule and the third carrier substrate have a third release film therebetween;
S4: releasing the second release film to remove the second carrier substrate from the second touch-sensing submodule;
S5: utilizing a first bonding layer to attach the first touch-sensing submodule to the second touch-sensing submodule;
S6: releasing the first release film to remove the first carrier substrate from the first touch-sensing submodule;
S7: utilizing a second bonding layer to attach a flexible cover plate onto the first flexible touch sensing module, and wherein the second bonding layer is located between the flexible cover plate and the first flexible touch-sensing component; and
S8: releasing the third release film to remove the third carrier substrate.

17. The method for manufacturing the touch panel as claimed in claim 16, wherein the shielding layer is formed by printing a colored material on the first flexible touch-sensing component.

18. The method for manufacturing the touch panel as claimed in claim 16, wherein S7 comprises:
attaching the second bonding layer to the flexible cover plate; and
attaching the flexible cover plate with the second bonding layer to the first flexible touch-sensing component and the shielding layer.

19. The method for manufacturing the touch panel as claimed in claim 16, wherein the second bonding layer is disposed between the first flexible touch-sensing component and the first release film, and
wherein in S6, the second bonding layer is exposed after releasing the first release film, and
wherein in S7, the flexible cover plate is attached to the exposed second bonding layer.

20. The method for manufacturing the touch panel as claimed in claim 17, wherein the first flexible touch-sensing component and the second flexible touch-sensing component are film-type sensors.

21. The method for manufacturing the touch panel as claimed in claim 20, wherein the film-type sensors have a film and a metal nanowire conductive layer formed on the film.

22. The method for manufacturing the touch panel as claimed in claim 21, wherein the metal nanowire conductive layer comprises a first silver nanowire layer and a first overcoat layer.

23. The method for manufacturing the touch panel as claimed in claim 20, wherein the film-type sensors comprise a film and a transferable transparent conductive film attached to the film.

24. The method for manufacturing the touch panel as claimed in claim 16, wherein the third carrier substrate is releasably attached to the second flexible touch-sensing component through the third release film.

25. The method for manufacturing the touch panel as claimed in claim 16, wherein the second flexible touch-sensing component further comprises a hard coating layer, and the hard coating layer is in contact with the third release film.

26. The method for manufacturing the touch panel as claimed in claim 16, wherein the first bonding layer is disposed between the second release film and the second flexible touch-sensing component,
wherein in S4, the first bonding layer is exposed after releasing the second release film, and
wherein in S5, the first touch-sensing submodule is attached to the second touch-sensing submodule through the exposed first bonding layer.

27. The method for manufacturing the touch panel as claimed in claim 16, wherein S5 further comprises:
attaching the first bonding layer to the first flexible touch sensing module, and attaching the second touch-sensing submodule to the first touch-sensing submodule through the first bonding layer.

28. The method for manufacturing the touch panel as claimed in claim 16, wherein S1 and S2 are performed by roll-to-roll processes.

29. The method for manufacturing the touch panel as claimed in claim 16, wherein the second release film is entirely removed or partially removed in S4, and the first release film is entirely removed or partially removed in S6.

30. The method for manufacturing the touch panel as claimed in claim 22, wherein S2 further comprises S2-3: forming a flexible electrode component on the second flexible touch-sensing component, and wherein the first overcoat layer of the second flexible touch-sensing component is located between the flexible electrode component and the first silver nanowire layer of the second flexible touch-sensing component so that the flexible electrode component is electrically insulating from the first silver nanowire layer of the second flexible touch-sensing component.

* * * * *